United States Patent
Ishii et al.

(10) Patent No.: US 8,421,808 B2
(45) Date of Patent: Apr. 16, 2013

(54) DISPLAY CONTROLLER, DISPLAY CONTROL METHOD, DISPLAY CONTROL PROGRAM, AND MEMORY MEDIUM

(75) Inventors: Hidenori Ishii, Tokyo (JP); Daisaku Komiya, Tokyo (JP); Kenichi Fujita, Tokyo (JP)

(73) Assignee: Panasonic Corporation, Osaka (JP)

( * ) Notice: Subject to any disclaimer, the term of this patent is extended or adjusted under 35 U.S.C. 154(b) by 207 days.

(21) Appl. No.: 12/793,789

(22) Filed: Jun. 4, 2010

(65) Prior Publication Data
US 2010/0245371 A1  Sep. 30, 2010

Related U.S. Application Data

(63) Continuation of application No. PCT/JP2009/002399, filed on May 29, 2009.

(30) Foreign Application Priority Data

May 30, 2008  (JP) ................................ 2008-143706

(51) Int. Cl.
  *G06F 15/16* (2006.01)
  *G06F 13/00* (2006.01)
(52) U.S. Cl.
  USPC ............ 345/502; 345/503; 345/504; 345/537
(58) Field of Classification Search .......... 345/502–504, 345/3.1, 5, 537, 538
  See application file for complete search history.

(56) References Cited

U.S. PATENT DOCUMENTS

| 5,682,529 | A | 10/1997 | Hendry et al. |
| 6,064,420 | A * | 5/2000 | Harrison et al. ............... 725/136 |
| 2004/0221230 | A1 | 11/2004 | Kakemura |
| 2009/0019194 | A1 | 1/2009 | Toyama et al. |
| 2010/0180095 | A1 | 7/2010 | Fujibayashi et al. |

FOREIGN PATENT DOCUMENTS

| JP | 10-504119 | 4/1998 |
| JP | 2001-016545 | 1/2001 |
| JP | 2004-240279 | 8/2004 |
| JP | 2005-85057 | 3/2005 |
| JP | 2005-311776 | 11/2005 |
| JP | 2007-088933 | 4/2007 |
| JP | 2007-274216 | 10/2007 |
| WO | 2007/034886 | 3/2007 |

OTHER PUBLICATIONS

Mozilla Project, "Mozilla Developer Center—Plugins", [online] [May 26, 2008, seach] <URL: http://developer.mozilla.org/ja/docs/plugins>, pp. 1-2.

(Continued)

*Primary Examiner* — Hau Nguyen
(74) *Attorney, Agent, or Firm* — Greenblum & Bernstein, P.L.C.

(57) ABSTRACT

A display controller which prevents the duplication of functional parts and processes and which displays dynamic content on a plurality of displays is provided. A terminal used as the controller has a shared dynamic image decoder which decodes the dynamic content. A first frame buffer used by the terminal stores the decoded dynamic content. A buffer transfer unit sends the dynamic content stored in the first frame buffer to a second frame buffer used by an external monitor. A terminal display displays the dynamic content stored in the first frame buffer on a display of the terminal. An external monitor interface displays the dynamic content stored in the second frame buffer on an external monitor.

12 Claims, 19 Drawing Sheets

OTHER PUBLICATIONS

Japan Office Action in JP 2008-143706, mail date is Feb. 14, 2012.
C&R laboratory Shianndoaarukennkyuujo, "HTML+CSS Handbook 3$^{rd}$ Edition", Softbank Creative Co. Ltd. Mitsutoshi Nitta, Feb. 1, 2008, pp. 324, together with its English language partial translation.

Takashi Saito, "Let's Show Movies on Streaming Web for the First Time" First Edition, AI Publishing Company, Tetsuya Hayashi, vol. 1, Apr. 1, 2001, pp. 141, together with its English language partial translation.

* cited by examiner

710

<OBJECT CLASSID="clsid:22AA-BBBB-CCCC-DDDD-EEEEEEEE0000"WIDTH=300 HEIGHT=300> 711

<PARAM NAME=movie VALUE="test.mpg"> 712

<PARAM NAME=LOOP VALUE=false> 713

<PARAM NAME=quality VALUE=high> 714

<EMBED SRC="test.mpg"WIDTH=300 HEIGHT=300 LOOP=false QUALITY=high TYPE="video/mpeg"> 715

</EMBED>

</OBJECT>

FIG.4

```
<OBJECT CLASSID="clsid:22AA-2A-2A-2A-22AA0000" WIDTH=300 HEIGHT=300>    — 711
<PARME NAME=ORIGINALCLASSID VALUE="clsid:22AA-BBBB-CCCC-DDDD-EEEEEEE0000">    — 721
<PARAM NAME=movie VALUE="test.mpg">    — 712
<PARAM NAME=LOOP VALUE=false>    — 713
<PARAM NAME=quality VALUE=high>    — 714
<EMBED SRC="test.mpg" WIDTH=300 height=300 LOOP=false QUALITY=high TYPE="video/mpeg">    — 715
</EMBED>
</OBJECT>
```

```
<OBJECT CLASSID="" clsid:22AA-2A-2A-2A-22AA0000"WIDTH=300 HEIGHT=300    711
ORIGINALCLASSID="" clsid:22AA-BBBB-CCCC-DDDD-EEEEEE0000">
```

FIG.8

```
<EMBED SRC="test.mpg" WIDTH=300 HEIGHT=300 LOOP=false QUALITY=high TYPE="application/x-buffertransfer" ORIGINALTYPE="video/mpeg"> ~715
```

FIG.9

```
<EMBED SRC="test.mpg" WIDTH=300 HEIGHT=300 LOOP=false QUALITY=high TYPE="application/x-buffertransfer" ORIGINALTYPE="video/mpeg" ORIGINALCLASSID="clsid:22AA-BBBB-CCCC-DDDD-EEEEEEE0000">
```
～715

<OBJECT CLASSID="clsid:22AA-2A-2A-2A-22AA0000" WIDTH=40% HEIGHT=40%> ~711
<PARME NAME=ORIGINALCLASSID VALUE="clsid:22AA-BBBB-CCCC-DDDD-EEEEEEE0000"> ~721
<PARAM NAME=movie VALUE="test.mpg"> ~712
<PARAM NAME=LOOP VALUE=false> ~713
<PARAM NAME=quality VALUE=high> ~714
<PARAM NAME=Direction VALUE=destination> ~734
<EMBED SRC="test.mpg" WIDTH=300 height=300 LOOP=false QUALITY=high TYPE="video/mpeg"> ~715
</EMBED>
</OBJECT>

FIG.17

```
<OBJECT CLASSID="clsid:22AA-2A-2A-2A-22AA0000"WIDTH=40% HEIGHT=40%>
<PARME NAME=ORIGINALCLASSID VALUE="clsid:22AA-BBBB-CCCC-DDDD-EEEEEEE0000">
<PARAM NAME=movie VALUE="test.mpg">
<PARAM NAME=LOOP VALUE=false>
<PARAM NAME=quality VALUE=high>
<PARAM NAME=Direction VALUE=source>
<EMBED SRC="test.mpg"WIDTH=300 height=300 LOOP=false QUALITY=high TYPE="video/mpeg">
</EMBED>
</OBJECT>
```

FIG.18

DISPLAY CONTROLLER, DISPLAY CONTROL METHOD, DISPLAY CONTROL PROGRAM, AND MEMORY MEDIUM

CROSS REFERENCE TO RELATED APPLICATIONS

This application is a continuation of International Patent Application No. PCT/JP2009/002399, filed on May 29, 2009, the disclosure of which is incorporated herein by reference in its entirety. International Patent Application No. PCT/JP2009/002399 is entitled to the benefit of Japanese Patent Application No. 2008-143706, filed on May 30, 2008, the disclosure of which is incorporated herein by reference in its entirety.

TECHNICAL FIELD

The present invention relates to a display control apparatus, display control method, and display control program that display dynamic content on a plurality of display apparatuses, and a storage medium that stores this program.

BACKGROUND ART

In recent years, it has become possible for a portable small terminal (hereinafter referred to as "portable terminal") such as a mobile phone or PDA (personal digital assistant) to acquire a Web page from the Internet, and for the acquired Web page to be viewed using a browser.

However, a display screen of a portable terminal is smaller and of lower resolution than the display of a stationary terminal such as a personal computer. At the same time, most Web pages are created with viewing on a personal computer in mind. With personal computer displays, a screen size of 10 inches or more and an XGA (extended graphics array) resolution of 1,024 pixels×768 pixels are the mainstream. Therefore, a problem with portable terminals is the difficulty of viewing Web pages.

A portable terminal normally has a small screen of around two to four inches in size. With XGA resolution, images and characters are extremely small and difficult to see. On the other hand, if the resolution is lowered, only a few characters are displayed at a time and the number of line breaks increases, making numerous scrolling operations necessary as well as disrupting the screen layout. Especially when a Web page includes dynamic content so-called multimedia video content, such as photographs, maps, video (moving images), and the like, the video display size is even smaller than the portable terminal screen size, making it difficult to see.

Thus, one idea is to display a Web page acquired by a portable terminal on a separate, comparatively large-size monitor (hereinafter referred to as "external monitor"). An external monitor may be, for example, a television installed in the home, or in a school, office, coffee shop, or the like. In order to display a Web page on an external monitor, a portable terminal must be provided with a function for displaying a Web page on the external monitor display as well as the portable terminal display. A technology for displaying a Web page on a plurality of displays is described in Patent Document 1, for example.

The technology described in Patent Document 1 displays the same screen on a plurality of displays by writing display data stored in a frame buffer to a plurality of VRAMs (video random access memories) provided for each display. Use of this technology makes it possible to display a Web page acquired by a portable terminal on an external monitor as well.

However, a problem with the technology described in Patent Document 1 is that the screen layout is disrupted on an external monitor. This is because the resolution of a portable terminal display is lower than the resolution of a stationary terminal display.

Thus, a technology is described in Patent Document 2 and Non-Patent Document 1 relating to creating individual display data for each display.

FIG. 1 is a block diagram showing a configuration of a display control apparatus when the technology described in Patent Document 2 and Non-Patent Document 1 is applied.

As shown in FIG. 1, display control apparatus 10 has main body video decoder 12 and main body browser 13 corresponding to main body display section 11, and monitor video decoder 14 and monitor browser 15 corresponding to external monitor 20. Main body video decoder 12 and monitor video decoder 14 are implemented as browser plug-ins (see Non-Patent Document 1, for example).

In display control apparatus 10, proxy section 16 that performs data relaying is located between the main body system and monitor system and Web server 30. Display control apparatus 10 also includes input apparatus 17 and browser control section 18. Proxy section 16 holds main body display section 11 and main body video decoder 12 information.

Proxy section 16 acquires Web page data via IP (internet protocol) network 40 from Web server 30, and converts this to content data of the associated area of the respective displays together with individual display information. Then proxy section 16 passes the converted content data to main body browser 13 and monitor browser 15. If video data is included in the content data, proxy section 16 passes the video data to main body browser 13 and monitor browser 15 via main body video decoder 12 and monitor video decoder 14. Main body browser 13 and monitor browser 15 perform associated area display based on the content data passed from proxy section 16.

According to this kind of technology described in Patent Document 2, it is also possible for a Web page screen to be displayed on an external monitor in a suitable layout.

Patent Document 1: National Publication of International Patent Application No. HEI10-504119
Patent Document 2: Japanese Patent Application Laid-Open No. 2005-85057
Non-Patent Document 1: Mozilla Project, "Mozilla Developer Center—Plugins", [online], [May 26, 2008 search], <URL: http://developer.mozilla.org/ja/docs/Plugins>

DISCLOSURE OF INVENTION

Problems to be Solved by the Invention

In order to display video content, a video decoder that performs video content data acquisition and decoding is necessary, as shown in FIG. 1. In the case of a Web page that includes video content, information specifying an entity that performs video content decoding (hereinafter referred to as "specification information") is included in HTML (hypertext markup language) data constituting the basis thereof. A browser activates a video decoder specified by this specification information, and inserts video content decoded by the video decoder into the Web page. Therefore, the display control apparatus shown in FIG. 1 must include a plurality of decoders corresponding to a plurality of browsers, and perform a plurality of decoding processes on the same video content.

However, duplicate provision of a plurality of functional sections performing the same processing in an apparatus, and duplicate execution of the same processing, is undesirable in terms of cost, size, and processing load.

It is an object of the present invention to provide a display control apparatus, display control method, and display control program that avoid duplication of functional sections and duplication of processing and enable video content to be displayed by a plurality of display apparatuses, and a storage medium in which this program is stored.

Means for Solving the Problem

A display control apparatus of the present invention employs a configuration having: a content acquisition section that performs decoding of dynamic content and stores decoded dynamic content in a first buffer; a buffer transfer section that transfers the dynamic content stored in the first buffer to a second buffer; a first display control section that displays the dynamic content stored in the first buffer on a first display apparatus; and a second display control section that displays the dynamic content stored in the second buffer on a second display apparatus.

A display control method of the present invention has: a step of performing decoding of dynamic content; a step of storing decoded dynamic content in a first buffer for performing display on a first display apparatus; and a step of transferring the dynamic content stored in the first buffer to a second buffer for performing display on a second display apparatus.

A display control method of the present invention has: a step of acquiring specification information specifying a decoding entity that performs decoding of dynamic content; a step of, when the specification information specifies a dynamic content decoding section, decoding dynamic content using the dynamic content decoding section, and storing decoded dynamic content in a first buffer for performing display on a first display apparatus; and a step of transferring the dynamic content stored in the first buffer to a second buffer for performing display on a second display apparatus.

A display control method of the present invention has: a step of acquiring specification information specifying a decoding entity that performs decoding of dynamic content; a step of, when the specification information specifies the dynamic content decoding section, rewriting the specification information with contents specifying activation of a transfer buffer section; a step of inputting the specification information to a first rendering section that has the decoding entity specified by the specification information execute first processing that decodes dynamic content and stores decoded dynamic content in a first buffer for performing display on a first display apparatus, and a second rendering section that has the decoding entity specified by the specification information execute second processing that decodes dynamic content and stores decoded dynamic content in a second buffer for performing display on a second display apparatus; a step of, when the first rendering section gives a directive for execution of the first processing to the transfer buffer section, the dynamic content decoding section decoding the dynamic content and storing decoded dynamic content in the first buffer; and a step of, when the second rendering section gives a directive for execution of the second processing to the transfer buffer section, the transfer buffer section transferring the decoded dynamic content stored in the first buffer to the second buffer, and storing the decoded dynamic content in the second buffer.

A display control program of the present invention causes a computer to execute: processing that performs decoding of dynamic content; processing that stores decoded dynamic content in a first buffer for performing display on a first display apparatus; and processing that transfers the dynamic content stored in the first buffer to a second buffer for performing display on a second display apparatus.

A storage medium of the present invention has a configuration whereby an above program is stored in a computer-readable fashion.

Advantageous Effects of Invention

According to the present invention, decoded dynamic content can be transferred from a first buffer for performing display on a first display apparatus to a second buffer for performing display on a second display apparatus. Consequently, a separate dynamic content decoder need not be provided for the second display apparatus, and video content can be displayed on a plurality of display apparatuses while avoiding duplication of functional sections and duplication of processing.

BRIEF DESCRIPTION OF DRAWINGS

FIG. 4 is a drawing showing a sample extract of HTML data in Embodiment 1;

FIG. 7 is a drawing showing a sample extract of HTML data after activation plug-in modification in Embodiment 1;

FIG. 8 is a drawing showing another sample extract of HTML data after activation plug-in modification in Embodiment 1;

FIG. 9 is a drawing showing another sample extract of HTML data after activation plug-in modification in Embodiment 1;

FIG. 10 is a drawing showing another sample extract of HTML data after activation plug-in modification in Embodiment 1;

FIG. 17 is a drawing showing a sample extract of HTML data for main body display section use in Embodiment 2;

FIG. 18 is a drawing showing a sample extract of HTML data for external monitor use in Embodiment 2.

BEST MODE FOR CARRYING OUT THE INVENTION

Now, embodiments of the present invention will be described in detail with reference to the accompanying drawings.

Embodiment 1

Figure 1:
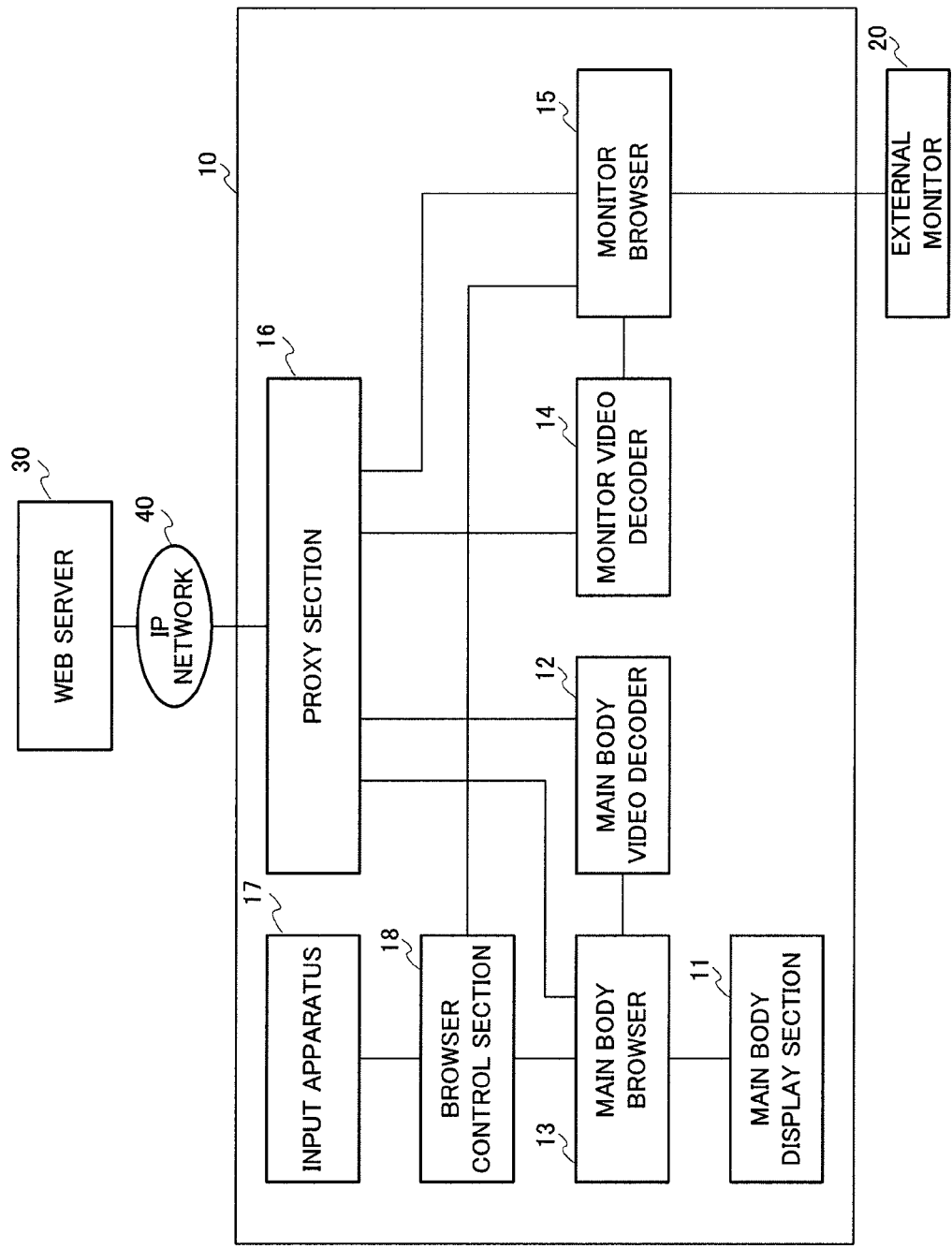
FIG. 1 is a block diagram showing a configuration of a conventional apparatus.
Figure 2:
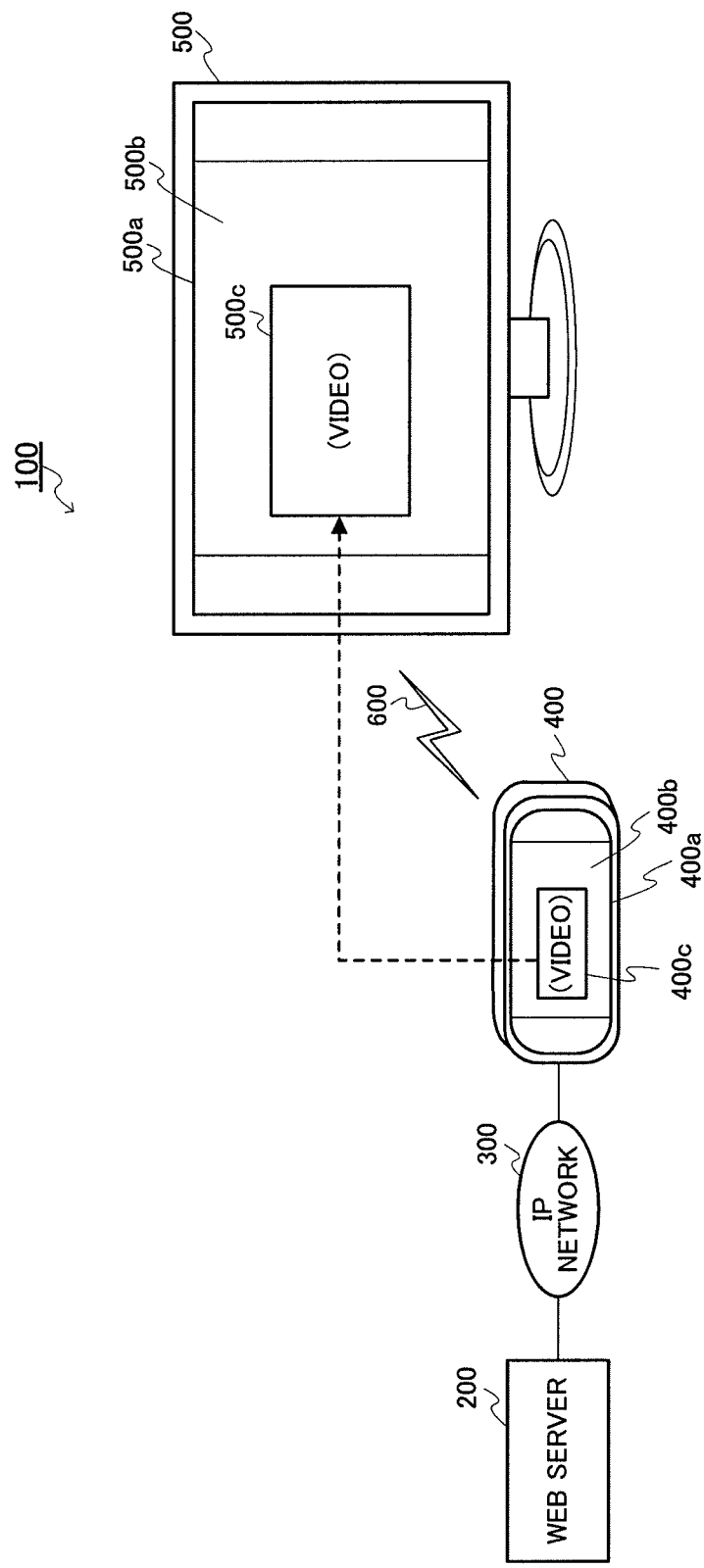
FIG. 2 is a system configuration diagram showing a configuration of an image display system that includes a display control apparatus according to Embodiment 1 of the present invention.

FIG. 2 is a system configuration diagram showing a configuration of an image display system that includes a display control apparatus according to Embodiment 1 of the present invention.

In FIG. 2, image display system 100 has Web server 200, IP network 300, portable terminal 400, and external monitor 500. Portable terminal 400 is a terminal such as a mobile phone, for example, that includes a display control apparatus according to the present invention. External monitor 500 is a display apparatus, such as a home television, for example, having display 500a that is larger—that is, of higher resolution—than main body display 400a of portable terminal 400.

Web server 200 stores data describing a Web page (hereinafter referred to as "content data"), and sends back content data in response to a request from portable terminal 400. That is to say, Web server 200 is a server accessed by portable terminal 400. Web server 200 stores static Web pages and dynamic Web pages including video (moving images), script, animation, and suchlike content. In this embodiment, the description assumes that dynamic content is video content (hereinafter referred to as "video" for convenience).

IP network 300 is a communication network that uses an IP. IP network 300 is, for example, a wide-area wireless network such as the Internet, a wireless LAN (local area network), or a wireless MAN (metropolitan area network) formulated by IEEE802.16/16e or the like.

Portable terminal 400 has a function of acquiring Web page content data (hereinafter referred to as "Web page" for convenience) via IP network 300. Portable terminal 400 also has a function of displaying a Web page on the terminal's display (hereinafter referred to as "main body display") 400a based on acquired content data. Portable terminal 400 can acquire and display a static Web page or a dynamic Web page that includes video. Portable terminal 400 also has a function of generating a plurality of data from data for displaying a Web page (hereinafter referred to as "display data"). Specifically, portable terminal 400 generates display data for main body display 400a and display data for external monitor 500 display (hereinafter referred to as "monitor display") 500a. Portable terminal 400 encodes generated external monitor 500 display data using a predetermined image compression method, and transmits it to external monitor 500 using radio communication channel 600 by means of short-range communication. The predetermined image compression method may be Motion-JPEG/JPEG2000, MPEG2, or H.264, for example.

When portable terminal 400 acquires a Web page including video, it uses video data decoded for main body display 400a for main body display 400a video display and external monitor 500 video display.

External monitor 500 has a function of receiving display data from portable terminal 400 and displaying a Web page on monitor display 500a based on the received display data. External monitor 500 supports a short-range communication method and display data format common to portable terminal 400. Radio communication channel 600 is a short-range communication channel that connects portable terminal 400 and external monitor 500. Radio communication methods that can be used for radio communication channel 600 include UWB (ultra wide band) or IEEE802.11, for example.

An example of an image display system 100 utilization mode will now be described using FIG. 2.

First, when a Web page including video is specified by a user, portable terminal 400 acquires the specified Web page from Web server 200, and displays it on main body display 400a. Then playback of video 400c is started in displayed Web page 400b. Then, when the user specifies that Web page 400b being displayed is to be displayed by external monitor 500, portable terminal 400 creates display data for external monitor 500 and outputs this to external monitor 500 via radio communication channel 600. As a result, Web page 500b is displayed on monitor display 500a of external monitor 500, and video 500c is displayed in Web page 500b.

That is to say, video data decoded for main body display 400a use is also utilized by the external monitor 500 Web page. Therefore, external monitor 500 video 500c is played back virtually in synchronization with video 400c playback on portable terminal 400. In fact, video 500c playback is somewhat delayed relative to video 400c playback due to the transmission of display data via radio communication and image compression/expansion processing, but this delay is too short to interfere with viewing.

In image display system 100 of this kind, a Web server 200 Web page is acquired by portable terminal 400, and can be displayed on the large display of external monitor 500 in a state in which the original layout is preserved.

Figure 3:
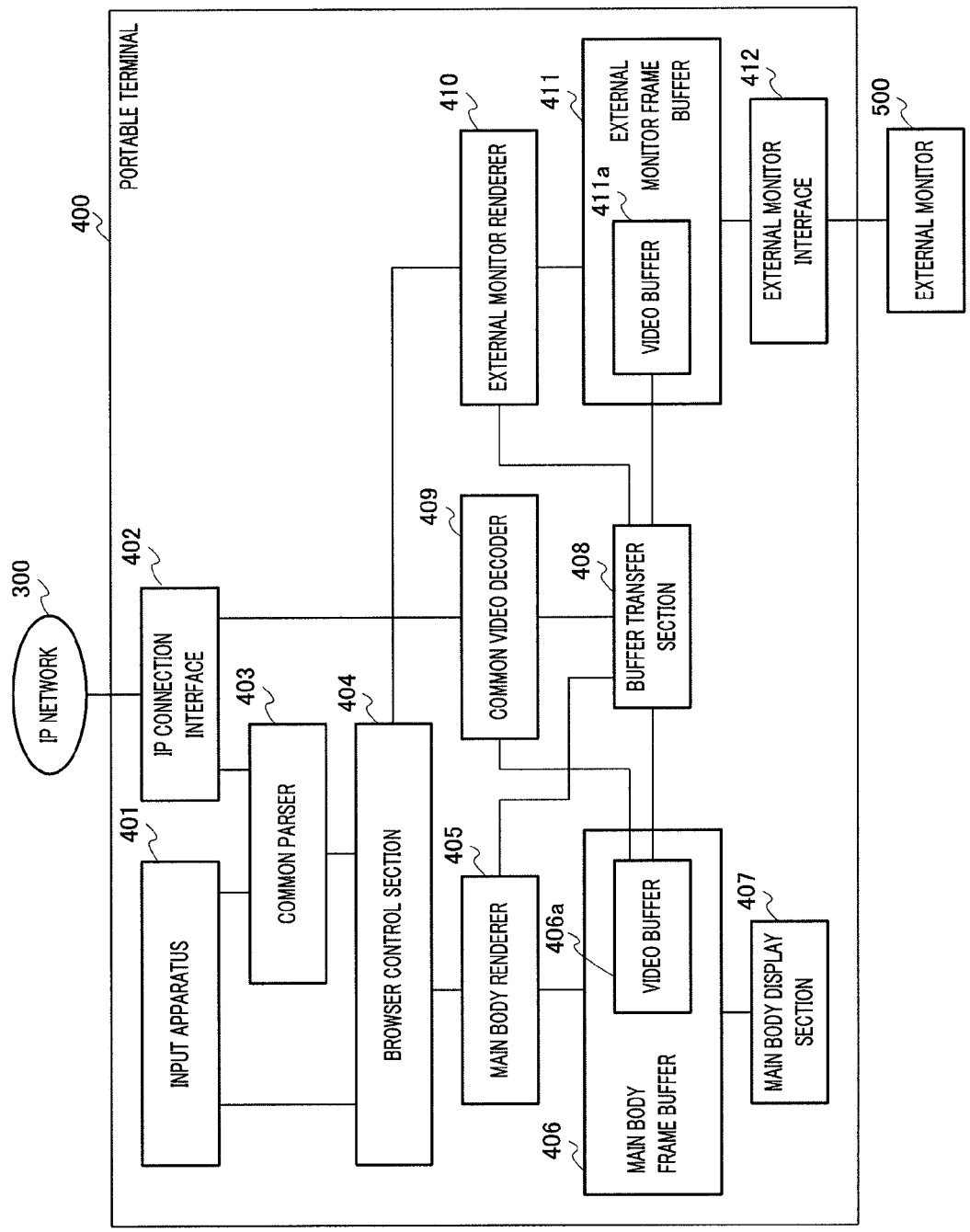
FIG. 3 is a block diagram showing a configuration of a portable terminal according to Embodiment 1.

Next, the configuration of portable terminal 400 will be described. FIG. 3 is a block diagram showing the configuration of portable terminal 400.

In FIG. 3, portable terminal 400 has input apparatus 401, IP connection interface 402, common parser 403, browser control section 404, main body renderer 405, main body frame buffer 406, main body display section 407, buffer transfer section 408, common video decoder 409, external monitor renderer 410, external monitor frame buffer 411, and external monitor interface 412. Common parser 403, browser control section 404, main body renderer 405, and external monitor renderer 410 form a Web page browser.

Input apparatus 401 is an input apparatus that accepts input from a user. In this embodiment, input apparatus 401 is a touch screen. In this embodiment, the concept of including hardware that performs input and software that performs output is assumed for input apparatus 401 for convenience. The software includes, for example, a device driver or user mode process that receives a hardware interrupt and outputs input information as an event in an application running on an OS (operating system).

Input apparatus 401 accepts a user input operation, and sends an event or message to another process—that is, common parser 403 or browser control section 404.

IP connection interface 402 is an interface for connecting to IP network 300. In this embodiment, the concept of including hardware and software is also assumed for IP connection interface 402 for convenience. The hardware includes, for example, a power amplifier for radio communication, and RF (radio frequency) and baseband chips. The software includes, for example, a device driver or user mode process that controls the hardware.

IP connection interface 402 accepts packet reception from the IP network 300 side, and sends an event or message to another process—that is, common parser 403 or common video decoder 409. IP connection interface 402 uses a socket interface or the like, and sends data input from another process—that is, common parser 403 or common video decoder 409—to IP network 300.

Common parser 403 has a function of receiving event input from input apparatus 401, and acquiring a Web page from Web server 200 by controlling IP connection interface 402. Common parser 403 also has a function of analyzing the contents of an acquired Web page and passing the analysis results to browser control section 404. Web page content data describes Web page display contents using a markup language such as HTML or XML (extensible markup language).

Assuming application of DOM (Document Object Model) standardized by the W3C (World Wide Web Consortium), for example, common parser 403 is equivalent to mainly the DOM Core, DOM HTML, and DOM Level 2 parts of the library implementing DOM. A component called a browser engine can generally be used for common parser 403. Specific examples are Trident, Gecko, KHTML, WebKit, and Presto. Trident is a Microsoft (registered trademark) Internet Explorer (registered trademark) component. The following description assumes that Web page content data is HTML data.

Browser control section 404 is a functional section comprising the central part of a browser that decides browser behavior using common parser 403. In response to a request, browser control section 404 issues a directive to main body renderer 405 and external monitor renderer 410 to perform common video decoding processing. This directive is executed by rewriting an acquired Web page. Specifically, browser control section 404 rewrites an external program (plug-in) specified for displaying video for HTML data to buffer transfer section 408 described later herein.

Main body renderer 405 is a functional section that operates after being called from browser control section 404 when browser display is performed by main body display section 407. Main body renderer 405 has a function of converting HTML data to display data for main body display section 407 described later herein, and storing this in main body frame buffer 406. Main body renderer 405 also has a function of deciding an area of video buffer 406a described later herein, and activating a plug-in as necessary.

Generally, main body renderer 405 activates a corresponding plug-in when there is a content specification by means of an OBJECT tag or EMBED tag in HTML data. When activating a plug-in, main body renderer 405 passes video buffer 406a area related information to the plug-in to be activated as necessary. Assuming DOM application, main body renderer 405 is equivalent to a part that performs drawing in the library that implements DOM. A browser engine can also be used for main body renderer 405.

Display data for displaying a Web page on main body display section 407 is stored in main body frame buffer 406. An area in which video data displayed on main body display section 407 described later herein is stored within main body frame buffer 406 is taken to be video buffer 406a. If browser control section 404 is executed as software of a higher application layer than the OS, main body frame buffer 406 must be accessible from this application. To simplify the description, in this embodiment main body frame buffer 406 is assumed to be a single buffer, but a configuration equipped with a plurality of buffers may also be used in order to absorb delay due to a drawing operation.

Main body display section 407 includes a display attached to the main body of portable terminal 400, and has a function of displaying a Web page based on display data stored in main body frame buffer 406. Main body display section 407 includes hardware such as a display device using liquid crystal or organic EL (electroluminescence), a driver module, and the like, and software such as a device driver.

Buffer transfer section 408 has a function of activating common video decoder 409 described later herein, and issuing a directive for video data decoding and writing to video buffer 406a. Buffer transfer section 408 also has a function of transferring a part of display data stored in main body frame buffer 406 that is stored in video buffer 406a—that is, decoded video data—to external monitor frame buffer 411 described later herein.

Buffer transfer section 408 is a process activated instead of common video decoder 409 when common video decoder 409 should be activated by main body renderer 405 conventionally. Thus, buffer transfer section 408 is a process that controls activation of common video decoder 409 instead of main body renderer 405. Buffer transfer section 408 activation, and common video decoder 409 activation by buffer transfer section 408, are implemented by means of HTML rewriting by above-described browser control section 404. Details of HTML rewriting will be given later herein.

Common video decoder 409 has a function of decoding data constituting the basis of video (hereinafter referred to as "video data"), and creating video data capable of being stored in a frame buffer. Common video decoder 409 acquires video data from Web server 200 in FIG. 2 via IP connection interface 402 and IP network 300, and sequentially performs decoding on the acquired video data. Then common video decoder 409 writes decoded video data to a location specified by buffer transfer section 408.

Common video decoder 409 is a process activated and controlled by buffer transfer section 408 when it should be activated and controlled by a renderer conventionally. Common video decoder 409 activation and control by buffer transfer section 408 is implemented by means of HTML rewriting by above-described browser control section 404.

External monitor renderer 410 has a function of converting HTML data to display data for external monitor 500, and storing this data in external monitor frame buffer 411. External monitor renderer 410 also has a function of activating a plug-in as necessary, in the same way as main body renderer 405.

External monitor renderer 410 differs from main body renderer 405 in having knowledge relating to the size of a drawing area in external monitor 500. This enables external monitor renderer 410 to generate display data in such a way that a Web page can be displayed with a suitable layout on external monitor 500 having a different resolution from main body display section 407.

Display data for displaying a Web page on external monitor 500 is stored in external monitor frame buffer 411. An area in which video data displayed on external monitor 500 is stored within external monitor frame buffer 411 is taken to be video buffer 411a. If browser control section 404 is executed as software of a higher application layer than the OS, external monitor frame buffer 411 must be accessible from this application. To simplify the description, in this embodiment external monitor frame buffer 411 is assumed to be a single buffer, but a configuration equipped with a plurality of buffers may also be used in order to absorb delay due to a drawing operation.

External monitor interface 412 is an interface connected to external monitor 500 for transmitting display data to external monitor 500. In this embodiment, the concept of including software and hardware is assumed for external monitor interface 412 for convenience. The software includes a process that creates display data suitable for external monitor 500, a device driver that controls the communication channel to external monitor 500, a buffer that temporarily stores display data, and so forth. The hardware is an interface for sending display data to the communication channel.

Although not shown, portable terminal 400 has a CPU (central processing unit), a storage medium such as ROM (read only memory) in which a control program is stored, working memory such as RAM (random access memory), and so forth. The functions of the above sections are implemented by execution of the control program by the CPU, for example.

Portable terminal 400 of this kind can transfer decoded video content from main body frame buffer 406 to external monitor frame buffer 411. Consequently, portable terminal 400 does not need to be separately equipped with a functional section for acquiring video from Web server 200 for external monitor 500, and duplication of functional sections and duplication of processing can be avoided. Also, portable terminal 400 can display a Web page acquired from Web server 200 on the display of external monitor 500 while preserving the original Web page layout. Furthermore, portable terminal 400 can maintain synchronization of video playback between main body display section 407 and external monitor 500.

The configuration of HTML data acquired by portable terminal 400 will now be described.

FIG. 4 is a drawing showing a sample extract of HTML data of a Web page that displays video using an OBJECT tag and EMBED tag.

As shown in FIG. 4, HTML data 710 includes OBJECT tag 711, PARAM tags 712 through 714, and EMBED tag 715.

OBJECT tag 711 specifies a content class ID (identifier) as a CLASSID attribute, specifies the horizontal length of a content display area as a WIDTH attribute, and specifies the vertical length of the content display area as a HEIGHT attribute.

PARAM tag 712 specifies the address of a video file that is output as content. PARAM tags 713 and 714 specify parameters relating to the playback method. PARAM tags 712 through 714 specify a parameter name using a NAME attribute, and specify a parameter value using a VALUE attribute.

EMBED tag 715 specifies the name of an output video file using an SRC attribute, specifies the horizontal length of a dynamic content (here, video) display area using a WIDTH attribute, and specifies the vertical length of the dynamic content display area using a HEIGHT attribute. Also, EMBED tag 715 specifies the dynamic content playback method using a LOOP attribute and a QUALITY attribute, and specifies the MIME (multipurpose internet mail extension) type using a TYPE attribute. Apart from the TYPE attribute, the contents specified in OBJECT tag 711 and PARAM tags 712 through 714 are equivalent. Here, a case is shown in which dynamic content is in MPEG format, but dynamic content is not limited to this.

When video is included in HTML data 710, a class ID or MIME type corresponding to an external program (plug-in) for video playback is specified as an OBJECT tag CLASSID attribute or EMBED tag TYPE attribute. Therefore, portable terminal 400 can determine whether or not video is included in HTML data 710 based on whether or not such a specification has been made. Also, video included in HTML data 710 can be played back by activating a corresponding plug-in based on the OBJECT tag CLASSID attribute or EMBED tag TYPE attribute.

The operation of portable terminal 400 having the above configuration will now be described.

Figure 5:
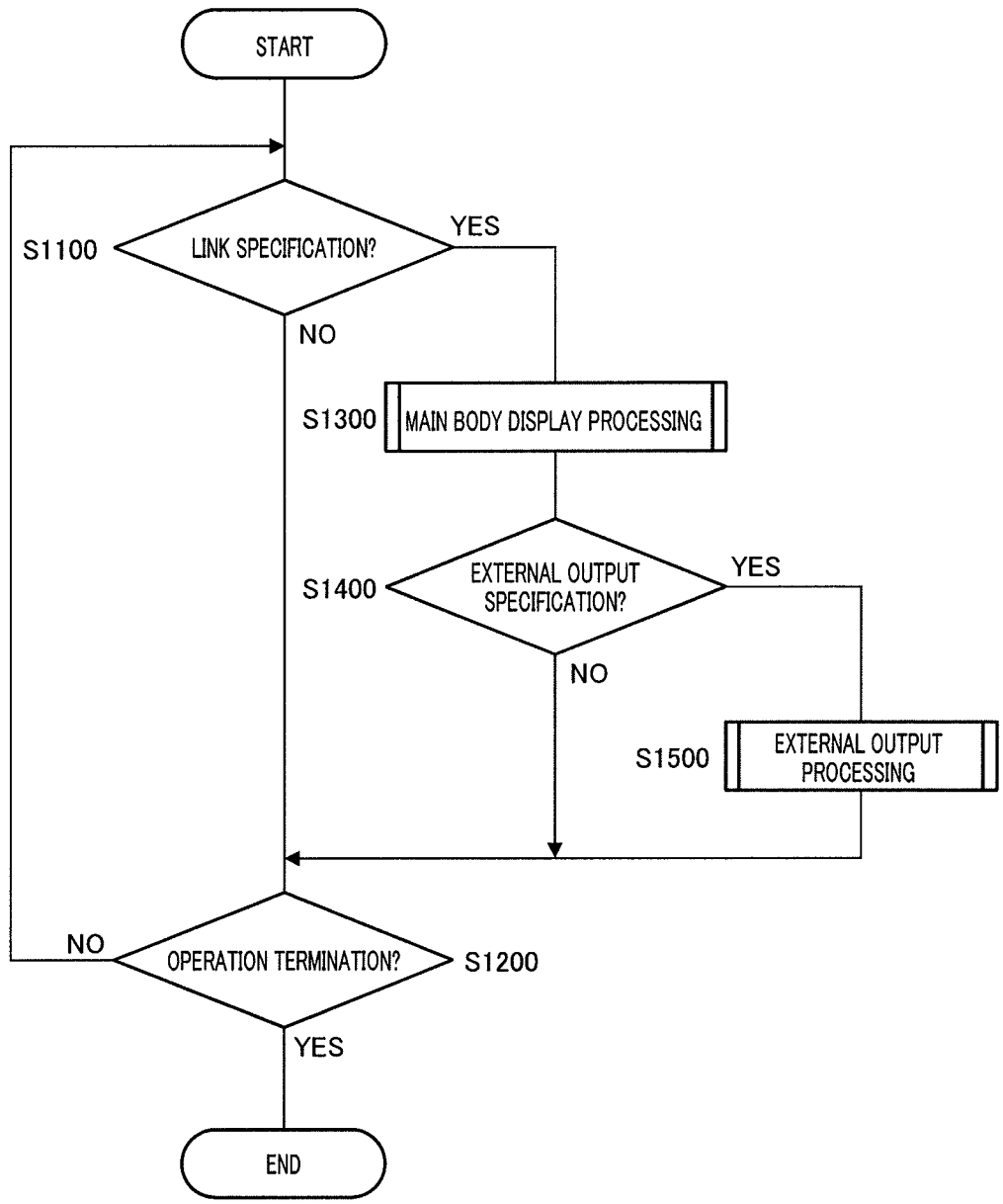
FIG. 5 is a flowchart showing the overall operation of a portable terminal according to Embodiment 1.

FIG. 5 is a flowchart showing the overall operation of portable terminal 400.

First, portable terminal 400 determines whether or not there is a Web page link specification (S1100). Specifically, portable terminal 400 determines whether or not a URL (uniform resource locator) or URI (uniform resource identifier) of a Web page link to be displayed by a Web browser has been specified.

When a Web browser is operating, a link specification is made by a user touching a link part displayed by the Web browser, for example. When the Web browser is not operating, a link specification is made by a user touching an icon denoted by the URL displayed on the screen, for example. Determination of whether or not there is a link specification is performed, for example, by determining whether or not an event detection message indicating that a link has been specified has been input to common parser 403 from input apparatus 401.

If a link specification has been made (S1100: YES), portable terminal 400 executes main body display processing (S1300). Main body display processing is processing for displaying a specified Web page on main body display section 407. Details of main body display processing will be given later herein.

Then portable terminal 400 determines whether or not there is a specification of Web page display by external monitor 500—that is, external output of display data (S1400). Specifically, portable terminal 400 determines, for example, whether or not display of the same Web page on external monitor 500 as that being displayed by main body display section 407 has been specified by means of an input apparatus 401 user operation.

An external output specification is made, for example, by the user touching an icon indicating external monitor 500 displayed on the touch panel. An external output specification can also be made by the user performing a drag-and-drop of a browser window displayed on main body display section 407 to an icon indicating external monitor 500. If a button for external output specification is provided on portable terminal 400, an external output specification is made by depression of this button by the user, for example. Determination of whether or not there is an external output specification is performed, for example, by determining whether or not an event detection message indicating that external output has been specified has been input to browser control section 404 from input apparatus 401. Since detection of an external output specification is performed at a different location from the Web page, this detection is performed by browser control section 404 rather than common parser 403.

If an external output specification has been made (S1400: YES), portable terminal 400 executes external output processing (S1500). External output processing is processing for displaying the same Web page on external monitor 500 as that being displayed by main body display section 407. Details of external output processing will be given later herein.

On the other hand, if a link specification has not been made, or if an external output specification has not been made (S1100: NO, S1400: NO), portable terminal 400 determines whether or not a directive for operation termination has been given by means of an input apparatus 401 user operation or the like (S1200). If an operation termination directive has not been given (S1200: NO), portable terminal 400 returns to step S1100 and continues operation, whereas if an operation termination directive has been given (S1200: YES), portable terminal 400 terminates the series of operations.

By means of such processing, portable terminal 400 receives a link specification and executes main body display processing, and receives an external output specification and executes external output processing.

Figure 6:
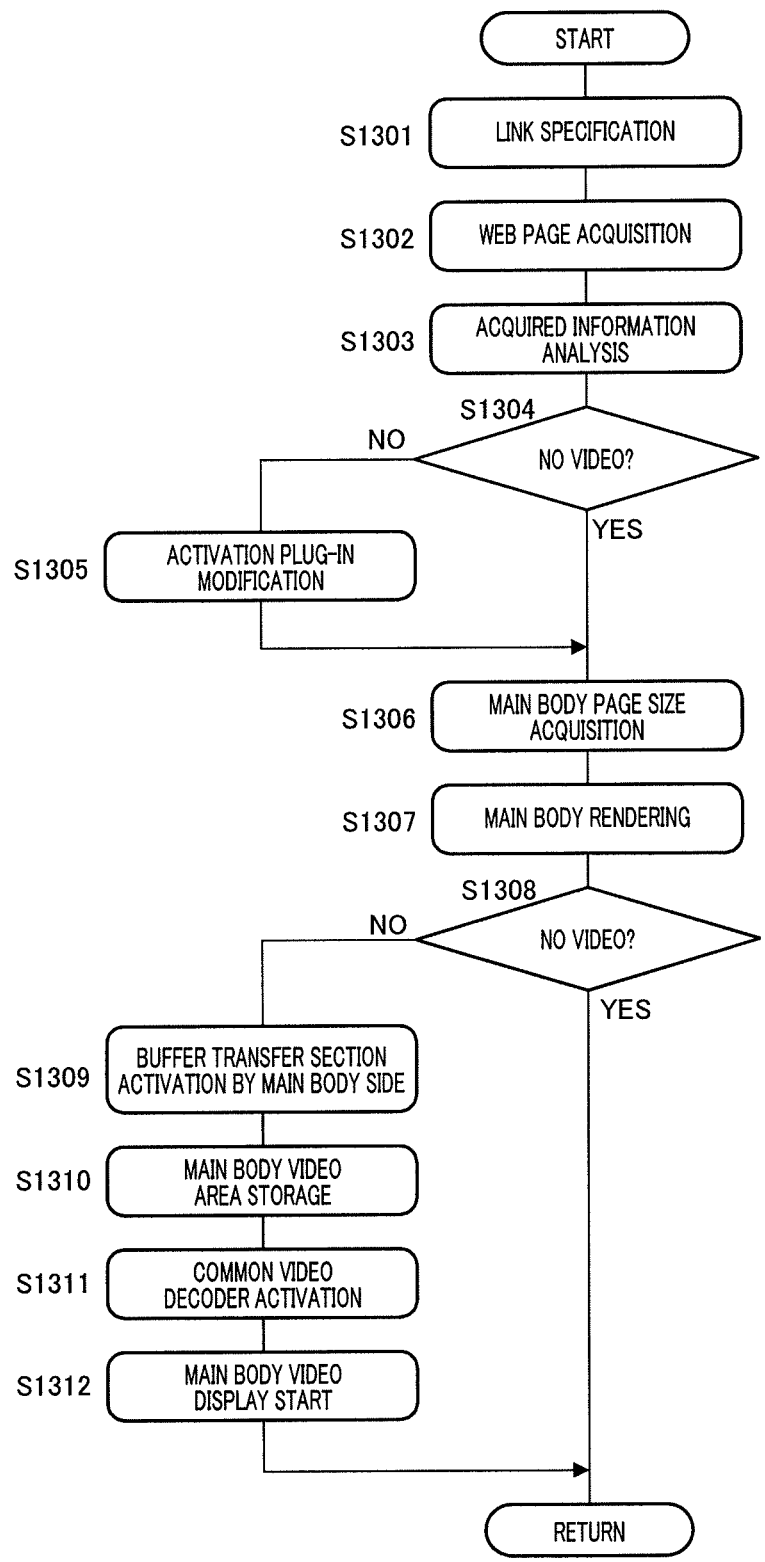
FIG. 6 is a flowchart showing main body display processing in Embodiment 1.

FIG. 6 is a flowchart showing main body display processing.

First, common parser 403 detects a link specification (S1301).

Then common parser 403 acquires HTML data of the Web page that is the destination of the specified link from Web server 200 via IP connection interface 402 and IP network 300 (S1302).

Common parser 403 then analyzes the acquired HTML data and creates parsed data, and passes the created parsed data to browser control section 404 (S1303). Parsed data is a data structure indicating the structure of HTML data, and is represented, for example, as a W3C DOM core specification DOM Structure Model.

Then browser control section 404 determines whether or not video is included in the HTML data (S1304). In this embodiment, browser control section 404 determines whether or not there is video by analysis of the OBJECT tag and EMBED tag shown in FIG. 4.

If video is included in the HTML data (S1304: NO), browser control section 404 performs modification of the activation plug-in for video playback on the HTML data (S1305). One object of activation plug-in modification is to activate buffer transfer section 408 rather than common video decoder 409 for the renderer that operates based on the HTML data, as described above. Another object is to suppress activation of common video decoder 409 when Web page display on external monitor 500 is started thereby.

Activation plug-in modification processing for HTML data by browser control section 404 will now be described.

FIG. 7 is a drawing showing a sample extract of HTML data after activation plug-in modification has been performed on the HTML data shown in FIG. 4. Parts in FIG. 7 corresponding to those in FIG. 4 are assigned the same reference codes as in FIG. 4, and descriptions thereof are omitted here. Parts that differ from FIG. 4—that is, modified parts—are underlined.

It is assumed here that common video decoder 409 corresponds to class ID "clsid:AA-BBBB-CCCC-DDDD-EEEEEEE0000". Also, the class ID of buffer transfer section 408 is assumed to have been set to "clsid:22AA-2A-2A-2A-22AA0000".

In this case, the CLASSID attribute of OBJECT tag 711 in FIG. 4 matches the class ID of common video decoder 409, and therefore the CLASSID attribute of OBJECT tag 711 is rewritten to generate HTML data 720.

Specifically, as shown in FIG. 7, browser control section 404 rewrites the CLASSID attribute of OBJECT tag 711 as buffer transfer section 408 class ID "clsid:22AA-2A-2A-2A-22AA0000". Then, as shown in FIG. 7, portable terminal 400 adds PARAM tag 721 in which the original class ID is written as an ORIGINALCLASSID attribute. By this means, HTML data 720 following activation plug-in modification is data specifying not common video decoder 409 but buffer transfer section 408 as a plug-in for video playback. Also, HTML data 720 following activation plug-in modification is data that includes information indicating the pre-modification plug-in.

Activation plug-in modification can also be implemented by means of other methods.

FIG. 8 through FIG. 10 are drawings showing other sample extracts of HTML data after activation plug-in modification. Parts in FIG. 8 through FIG. 10 corresponding to those in FIG. 4 are assigned the same reference codes as in FIG. 4, and descriptions thereof are omitted here. Parts that differ from FIG. 4—that is, modified parts—are underlined.

FIG. 8 shows OBJECT tag 711 after activation plug-in modification when a method is employed whereby the original class ID is embedded as an ORIGINALCLASSID attribute of the OBJECT tag.

FIG. 9 shows EMBED tag 715 after activation plug-in modification when a method is employed whereby buffer transfer section 408 MIME type "application/x-buffertransfer" is written as a TYPE attribute of the EMBED tag, and the original MIME type is embedded as an ORIGINALTYPE attribute.

FIG. 10 shows EMBED tag 715 after activation plug-in modification when a method is employed whereby, in addition to the method illustrated in FIG. 9, the original class ID specified by the OBJECT tag is embedded as an ORIGINALCLASSID attribute.

By means of such methods as shown in FIG. 8 through FIG. 10, also, HTML data 720 after activation plug-in modification can be made to specify not common video decoder 409 but buffer transfer section 408 as a plug-in for video playback. Also, HTML data 720 after activation plug-in modification can be made data that includes information indicating the pre-modification plug-in.

On the other hand, if video is not included in the HTML data (S1304: YES in FIG. 6), browser control section 404 calls main body renderer 405. Then browser control section 404 passes the HTML data to main body renderer 405 and gives a directive to start Web page rendering. On receiving this directive, main body renderer 405 acquires the size (resolution) of the Web page display part of main body display section 407 (S1306).

Main body renderer 405 then performs rendering for displaying the Web page on main body display section 407 (S1307). This rendering is performed by generating display data by performing rendering from the HTML data based on the size of the Web page display part of main body display section 407, and writing the generated display data to main body frame buffer 406. The display data written to main body frame buffer 406 is displayed on main body display section 407.

Then main body renderer 405 determines whether or not video is included in the Web page by means of the same kind of method as in step S1304 (S1308).

If video is included in the Web page (S1308: NO), main body renderer 405 activates buffer transfer section 408 and makes various settings necessary for buffer transfer section 408 operation (S1309).

The actual procedure is as follows. First, main body renderer 405 calculates the position of a video display area in the Web page display area of main body display section 407, and the address of video buffer 406a. In the case of a Microsoft (registered trademark) Windows (registered trademark) browser, it is possible for main body renderer 405 to set video buffer 406a using a Windows (registered trademark) device context instead of an address. Then main body renderer 405 analyzes an OBJECT tag of the HTML data, and activates a plug-in corresponding to the class ID written in the CLASSID attribute of the OBJECT tag.

In this embodiment the class ID of buffer transfer section 408 is written, as shown in FIG. 7. Therefore, main body renderer 405 activates buffer transfer section 408, which is the plug-in corresponding to this class ID. When activating buffer transfer section 408, main body renderer 405 specifies "original class ID (or original MIME type)", "video display area position and size", "video data address in main body frame buffer (video buffer address)", "video file address", PARAM tag and OBJECT tag attributes, and EMBED tag attributes, to buffer transfer section 408 as parameters.

Then buffer transfer section 408 holds internally "video buffer address" specified by main body renderer 405 (S1310). Buffer transfer section 408 then determines the plug-in to be activated from "original class ID" or "original MIME type" specified by main body renderer 405, and activates common video decoder 409 (S1311). In this embodiment, buffer transfer section 408 activates common video decoder 409 since the common video decoder 409 class ID is specified as "original class ID". At this time, buffer transfer section 408 specifies parameters other than buffer transfer section 408 "class ID" and "MIME type" specified by main body renderer 405. A parameter identical to a parameter used for an existing video decoder can be set for common video decoder 409. Therefore, when activating common video decoder 409, it is also possible for buffer transfer section 408 to specify an original class ID (or original MIME type). In this case, an existing plug-in can be utilized directly.

Then common video decoder 409 performs video decoding on the video file specified as "video file address", based on "video display area position and size" specified by buffer transfer section 408 (S1312). Specifically, common video decoder 409 acquires video data of the specified video file from Web server 200 via IP connection interface 402 and IP network 300. Then common video decoder 409 writes decoded video data to video buffer 406a specified as "video buffer address".

By this means, video display is started on main body display section 407, and portable terminal 400 terminates main body display processing and returns to the processing in FIG. 5. If video is not included in the Web page (S1308: YES), portable terminal 400 terminates main body display processing and returns to the processing in FIG. 5 without performing the processing in steps S1309 through S1312.

In this way, portable terminal 400 can activate buffer transfer section 408 when video is included in a Web page. Then portable terminal 400 can start video decoding by common video decoder 409 based on buffer transfer section 408 control.

Figure 11:
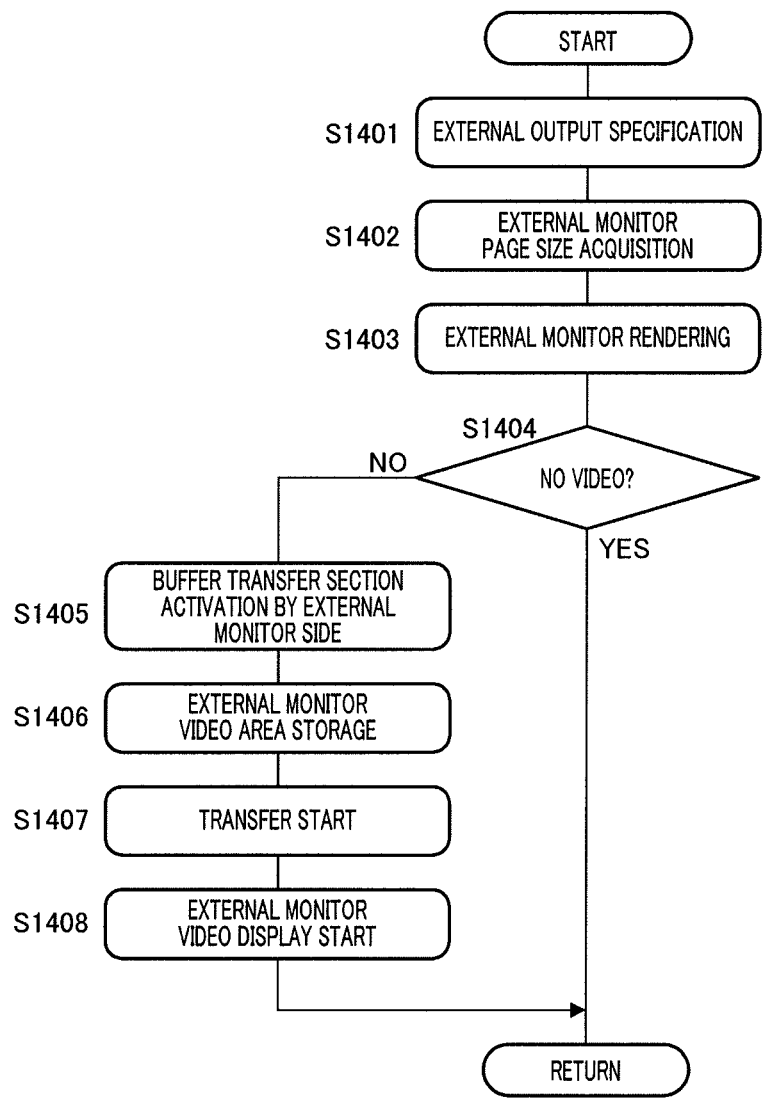
FIG. 11 is a flowchart showing external output processing in Embodiment 1.

FIG. 11 is a flowchart showing external output processing.

First, browser control section 404 detects an external output specification (S1401).

Then browser control section 404 calls external monitor renderer 410 based on HTML data in which the activation plug-in was modified in step S1305 in FIG. 6 (see FIG. 7). Browser control section 404 then passes the HTML data to external monitor renderer 410, and gives a directive to start Web page rendering. On receiving this directive, external monitor renderer 410 acquires the size (resolution) of the Web page display part of external monitor 500 (S1402).

External monitor renderer 410 then performs rendering for displaying the Web page on external monitor 500 (S1403). This rendering is performed by generating display data by performing rendering from the passed HTML data based on the acquired size of the Web page display part of external monitor 500, and writing the generated display data to external monitor frame buffer 411. The display data written to external monitor frame buffer 411 is output to external monitor 500 via external monitor interface 412 and radio communication channel 600, and is displayed on external monitor 500.

Then external monitor renderer 410 determines whether or not video is included in the Web page by means of the same kind of method as in step S1304 in FIG. 6 (S1404).

If video is included in the Web page (S1404: NO), external monitor renderer 410 attempts activation of buffer transfer section 408 and various settings necessary for buffer transfer section 408 operation in a similar way to the case of main body renderer 405 operation in step S1309 in FIG. 6 (S1405).

The actual procedure is as follows. First, external monitor renderer 410 calculates the position of a video display area in the Web page display area of external monitor 500, and the address of video buffer 411a. Then external monitor renderer 410 analyzes an OBJECT tag of the HTML data, and activates a plug-in corresponding to the class ID written in the CLASSID attribute of the OBJECT tag.

In this embodiment the class ID of buffer transfer section 408 is written, as shown in FIG. 7. Therefore, external monitor renderer 410 activates buffer transfer section 408, which is the plug-in corresponding to this class ID. When activating buffer transfer section 408, external monitor renderer 410 specifies "original class ID (or original MIME type)", "video display area position and size", "video data address in external monitor frame buffer (video buffer address)", "video file address", PARAM tag and OBJECT tag attributes, and EMBED tag attributes, to buffer transfer section 408 as parameters.

As buffer transfer section 408 has already been activated in step S1309 in FIG. 6, an activation operation is not performed in step S1405. Also, buffer transfer section 408 is set so that, if video for which decoding processing is performed by common video decoder 409 is specified and a directive for common video decoder 409 activation has been given, common video decoder 409 activation is not performed in response to that directive. In fact, therefore, in step S1405 buffer transfer section 408 activation and common video decoder 409 activation are not performed, and video playback on main body display section 407 is continued without interruption.

Then buffer transfer section 408 holds internally "video buffer address" specified by external monitor renderer 410 (S1406).

Buffer transfer section 408 then starts processing to transfer decoded video data from video buffer 406a of main body frame buffer 406 to video buffer 411a of external monitor frame buffer 411 (S1407). Specifically, buffer transfer section 408 transfers video data from the video buffer 406a address stored in step S1310 in FIG. 6 to the video buffer 411a address stored in step S1406. As a result, the same video data as in video buffer 406a of main body frame buffer 406 is stored in video buffer 411a of external monitor frame buffer 411.

By this means, video display is started on external monitor 500 (S1408), and portable terminal 400 terminates external output processing and returns to the processing in FIG. 5. If video is not included in the Web page (S1404: YES), portable terminal 400 terminates external output processing and returns to the processing in FIG. 5 without performing the processing in steps S1405 through S1408.

In this way, when displaying a Web page in which video is included on external monitor 500, portable terminal 400 can transfer video data stored in main body frame buffer 406 to external monitor frame buffer 411. That is to say, portable terminal 400 can use video data stored in main body frame buffer 406 for video playback on external monitor 500.

An example of the overall operation of image display system 100 will now be described. Here, a case will be described in which a Web page that includes video is displayed by main body display section 407 and external monitor 500.

Figure 12:
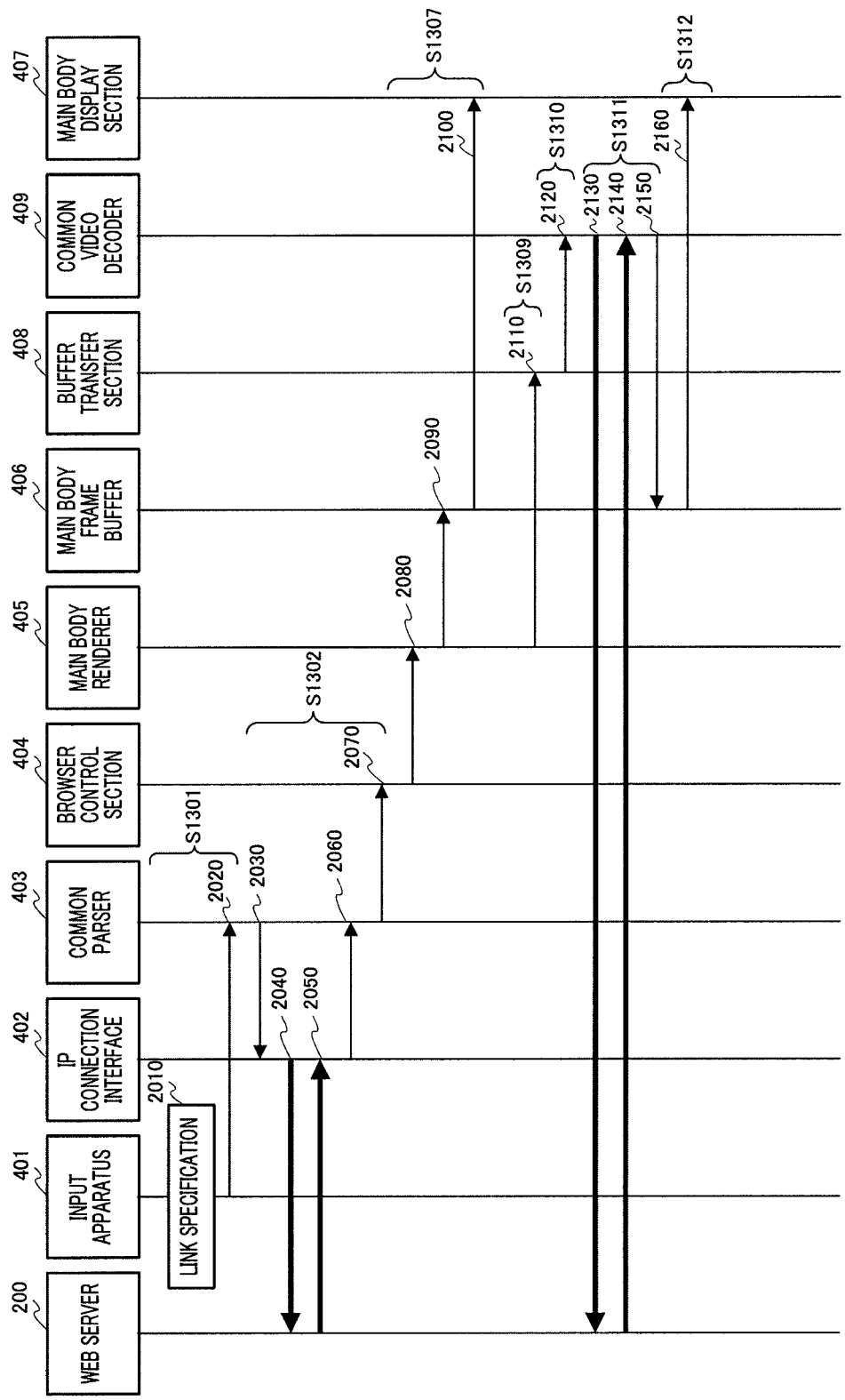
FIG. 12 is a first sequence diagram showing the overall operation of an image display system according to Embodiment 1.
Figure 13:
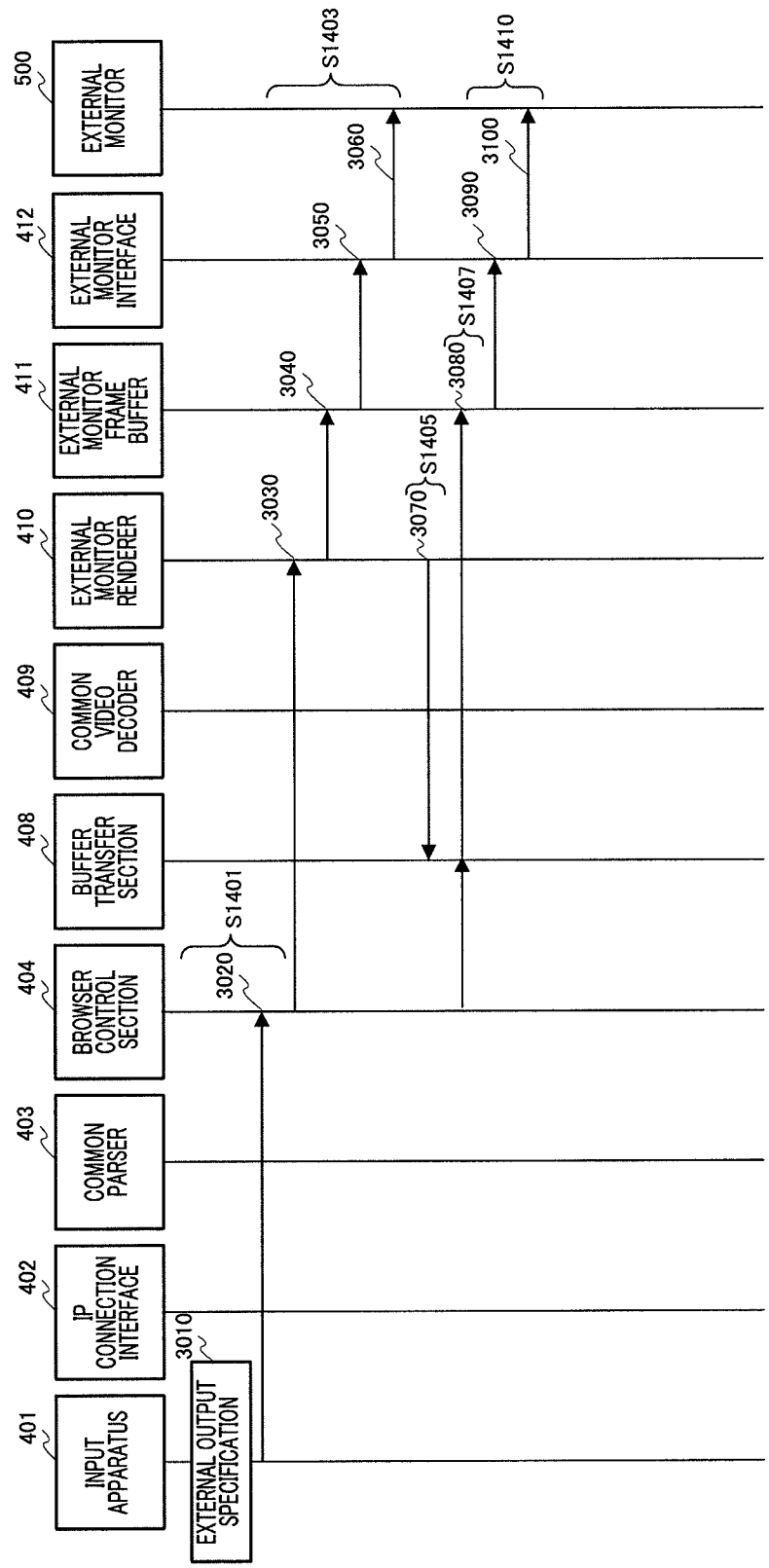
FIG. 13 is a second sequence diagram showing the overall operation of an image display system according to Embodiment 1.

FIG. 12 is a sequence diagram showing the overall operation of image display system 100 up until a Web page that includes video is displayed by main body display section 407, and FIG. 13 is a sequence diagram showing the overall operation of image display system 100 up until the Web page displayed by main body display section 407 is displayed by external monitor 500. In FIG. 12 and FIG. 13, processing enclosed in a rectangular box is processing executed by an apparatus section, a fine line indicates a function call signal output from an apparatus section, and a thick line indicates a communication signal generated by a packet.

In FIG. 12, processing 2010 and signal 2020 correspond to step S1301 in FIG. 6. Processing 2010 is processing whereby a user specifies a link, and signal 2020 is a message for activating common parser 403.

Signals 2030 through 2070 correspond to step S1302 in FIG. 6. Signal 2030 is a signal whereby common parser 403 calls IP connection interface 402 in order to have IP connection interface 402 make a Web page request. Signal 2030 is actually packet data in which an HTTP (hypertext transfer protocol) request for acquisition of a Web page by common parser 403 is stored. Signal 2040 is a signal whereby IP connection interface 402 makes a Web page request to Web server 200. Signal 2040 is actually an HTTP GET message or HTTP POST message, for example. Signal 2050 is a Web server 200 Web page response to a signal 2040 Web page request, and includes Web page HTML data. Signal 2060 is a message or event whereby IP connection interface 402, having detected a Web page response, reports the fact that a Web page response has been detected to common parser 403. And signal 2070 is a call signal whereby common parser 403 activates browser control section 404.

Signals 2080 through 2100 correspond to step S1307 in FIG. 6. Signal 2080 is a call signal whereby browser control section 404 activates main body renderer 405. Signal 2090 is a signal whereby main body renderer 405 writes display data generated as a result of rendering to main body frame buffer 406. Signal 2100 is a signal that is output in order for display data written in main body frame buffer 406 to be displayed on main body display section 407.

Signal 2110 corresponds to step S1309 in FIG. 6. Signal 2110 is a message whereby main body renderer 405 activates buffer transfer section 408.

Signal 2120 corresponds to step S1310 in FIG. 6. Signal 2120 is a message whereby buffer transfer section 408 activates common video decoder 409.

Signals 2130 through 2150 correspond to step S1311 in FIG. 6. Signal 2130 is a video data acquisition request output by common video decoder 409 to Web server 200 based on a video file address. Signal 2140 is video data output by Web server 200 in response to signal 2130 (a video data acquisition request). Signal 2150 is a signal whereby common video decoder 409 that has decoded video data writes display data to video buffer 406*a* of main body frame buffer 406.

Signal 2160 corresponds to step S1312 in FIG. 6. Signal 2160 is a signal for outputting video data stored in video buffer 406*a* of main body frame buffer 406 to main body display section 407 in order for video playback to be performed by main body display section 407.

By means of the operations up to this point, display of a Web page that includes video is started on main body display section 407.

In FIG. 13, processing 3010 and signal 3020 correspond to step S1401 in FIG. 11. Processing 3010 is processing whereby a user specifies external output, and signal 3020 is a message for activating browser control section 404.

Signals 3030 through 3060 correspond to step S1403 in FIG. 11. Signal 3030 is a message whereby browser control section 404 activates external monitor renderer 410. Signal 3040 is a signal whereby external monitor renderer 410 writes display data generated as a result of rendering to external monitor frame buffer 411. Signal 3050 is a signal that is output to external monitor interface 412 in order for display data written in external monitor frame buffer 411 to be displayed on external monitor 500. Signal 3060 is a signal that is further output onto radio communication channel 600 in order for display data to be displayed on external monitor 500.

Signal 3070 corresponds to step S1405 in FIG. 11. Signal 3070 is a message whereby external monitor renderer 410 activates buffer transfer section 408.

Signal 3080 corresponds to step S1407 in FIG. 11. Signal 3080 is a message whereby buffer transfer section 408 acquires video data stored in video buffer 406*a* of main body frame buffer 406, and performs a write to video buffer 411*a* of external monitor frame buffer 411.

Signals 3090 and 3100 correspond to step S1410 in FIG. 11. Signal 3090 is a signal for outputting external monitor frame buffer 411 display data to external monitor interface 412. Signal 3100 is a signal further output onto radio communication channel 600 in order for display data to be displayed on external monitor 500.

By means of such operations, display of a Web page that includes video is started on external monitor 500 as well.

As described above, according to this embodiment, buffer transfer section 408 transfers decoded video data from main body frame buffer 406 to external monitor frame buffer 411. Consequently, portable terminal 400 does not need a separate video decoder for generating display data for external monitor 500, and video content can be displayed by main body display section 407 and external monitor 500 while avoiding duplication of functional sections and duplication of processing. Also, portable terminal 400 can perform synchronized playback of main body display section 407 video and external monitor 500 video. That is to say, portable terminal 400 can add external monitor 500 playback while suppressing an increase in load, and can achieve virtual coincidence of external monitor 500 video display timing with the time at which video is played back on main body display section 407.

Moreover, portable terminal 400 can implement transfer of video data from main body frame buffer 406 to external monitor frame buffer 411 by the addition of buffer transfer section 408 and rewriting of HTML data by browser control section 404. By this means, portable terminal 400 can obtain the above-described effects without special modifications being made to an existing common parser, renderer, frame buffer, or video decoder.

Embodiment 2

A portable terminal according to Embodiment 2 of the present invention performs video decoding for a display that has the largest video display area when the size of the video display area differs among a plurality of displays.

Figure 14:
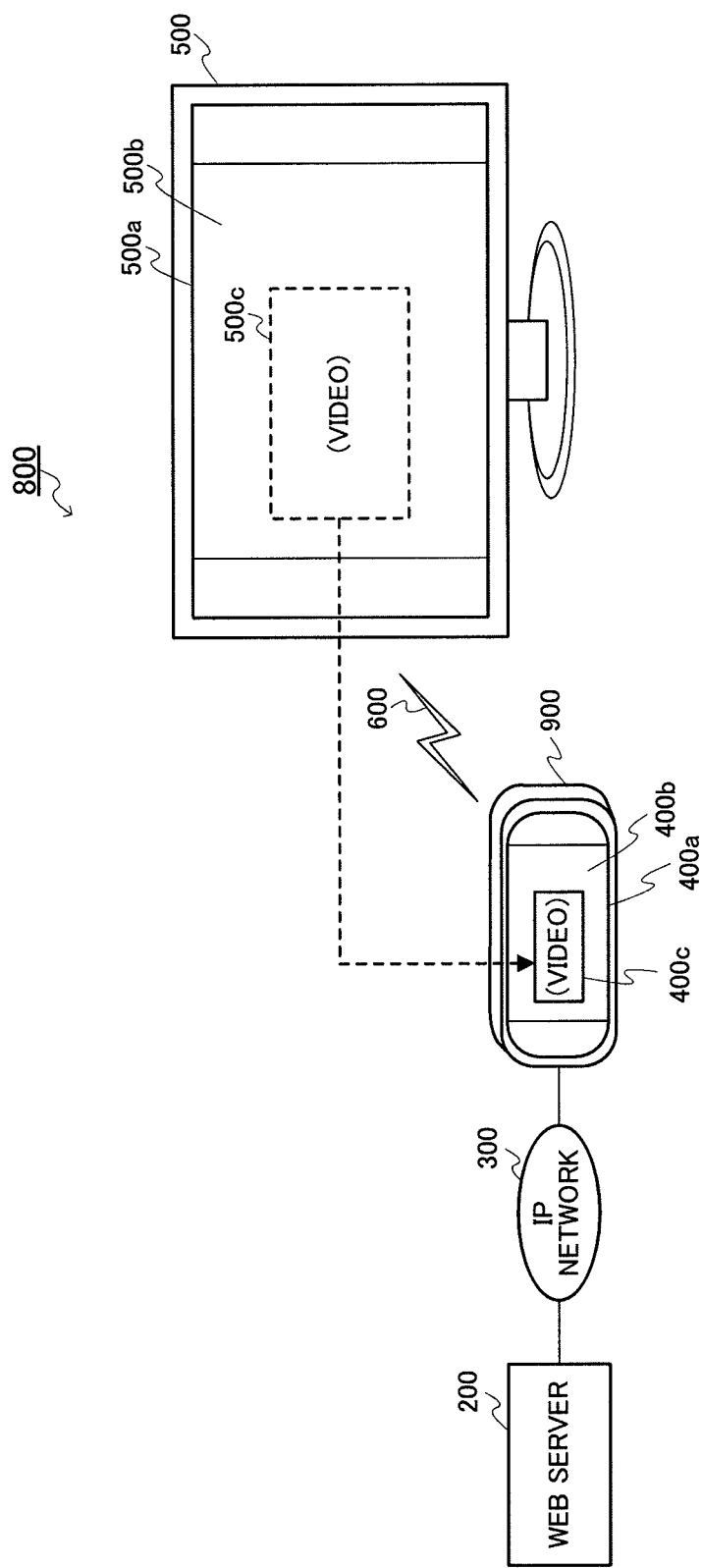
FIG. 14 is a system diagram showing a configuration of an image display system that includes a display control apparatus according to Embodiment 2 of the present invention.

FIG. 14 is a system diagram showing a configuration of an image display system that includes a display control apparatus according to Embodiment 2 of the present invention, corresponding to FIG. 2 of Embodiment 1. Parts in FIG. 14 identical to those in FIG. 2 are assigned the same reference codes as in FIG. 2, and descriptions thereof are omitted here.

As shown in FIG. 14, image display system 800 has portable terminal 900 instead of portable terminal 400 in FIG. 2, portable terminal 900 having a different configuration from portable terminal 400. The resolution of external monitor 500 is assumed to be higher than the resolution of main body display section 407 of portable terminal 900.

When portable terminal 900 acquires a Web page that includes video, it first performs video data decoding for higher-resolution external monitor 500. Then portable terminal 900 executes reduction processing on the decoded video data, and uses the reduced video data for video display by main body display 400a. That is to say, portable terminal 900 first generates large-size video 500c for display by monitor display 500a, and then generates small-size video 400c for display by main body display 400a.

Figure 15:
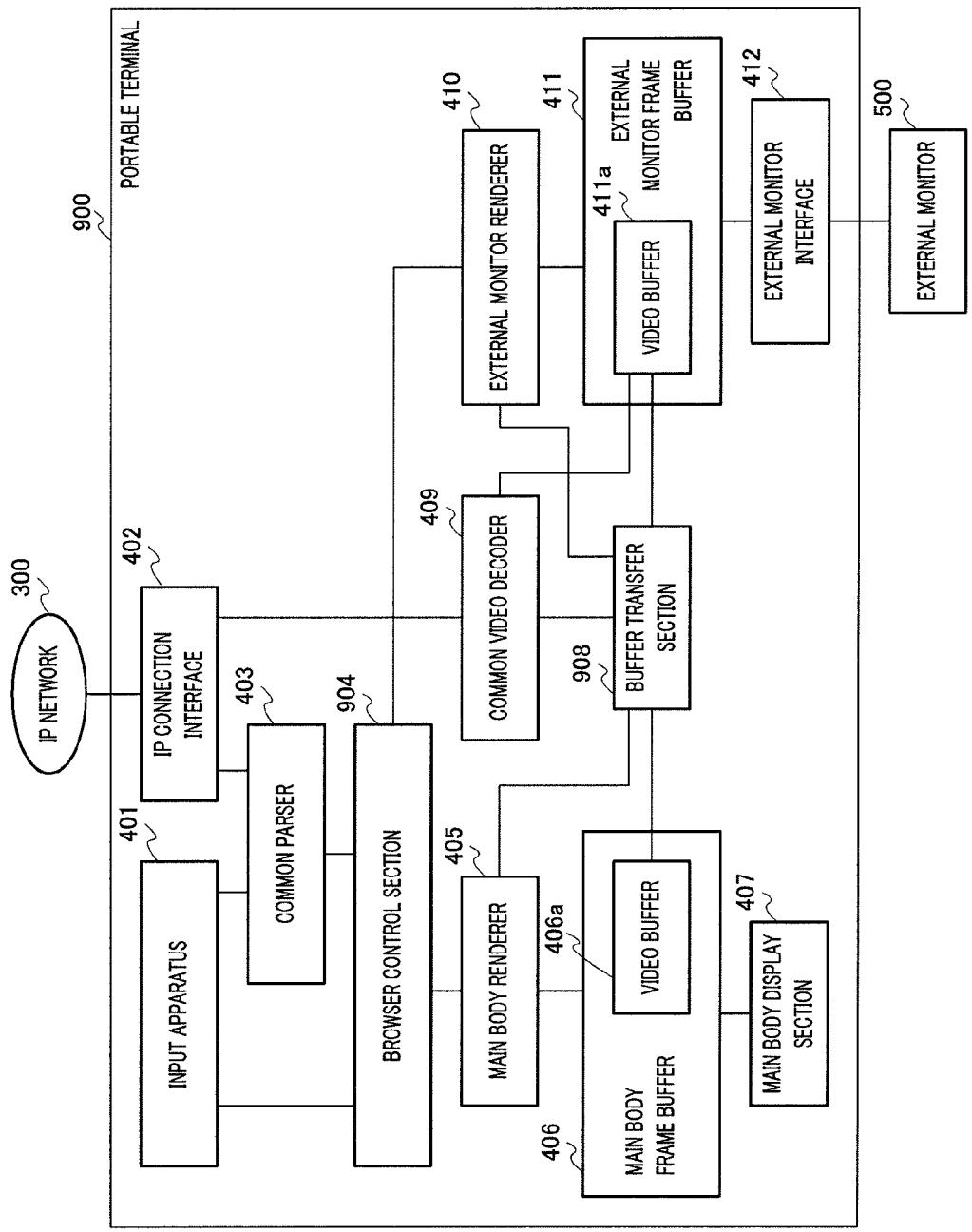
FIG. 15 is a block diagram showing a configuration of a portable terminal according to Embodiment 2.

FIG. 15 is a block diagram showing the configuration of portable terminal 900, corresponding to FIG. 3 of Embodiment 1. Parts in FIG. 15 identical to those in FIG. 3 are assigned the same reference codes as in FIG. 3, and descriptions thereof are omitted here.

As shown in FIG. 15, portable terminal 900 has browser control section 904 and buffer transfer section 908 that perform different operations from browser control section 404 and buffer transfer section 408 in FIG. 3. Also, common video decoder 409 is connected to external monitor frame buffer 411.

In addition to the functions of browser control section 404 of Embodiment 1, browser control section 904 has a function of specifying the frame buffer of the display having the largest video display area as a video data transfer source. Browser control section 904 also has a function of adding information specifying another frame buffer as a transfer destination to HTML data. In addition, browser control section 904 has a function of adding information specifying video editing processing to be executed on video data at the time of a transfer to HTML data.

Buffer transfer section 908 has the same kind of functions as buffer transfer section 408 of Embodiment 1. However, buffer transfer section 908 performs activation of common video decoder 409 based on a Direction parameter of a PARAM tag included in HTML data. Details of the Direction parameter will be given later herein.

According to portable terminal 900 of this kind, video data decoded for external monitor 500 use undergoes reduction processing when a Web page that includes video is acquired, and can be used for video display by main body display 400a.

The overall operation of portable terminal 900 having the above configuration will now be described.

Figure 16:
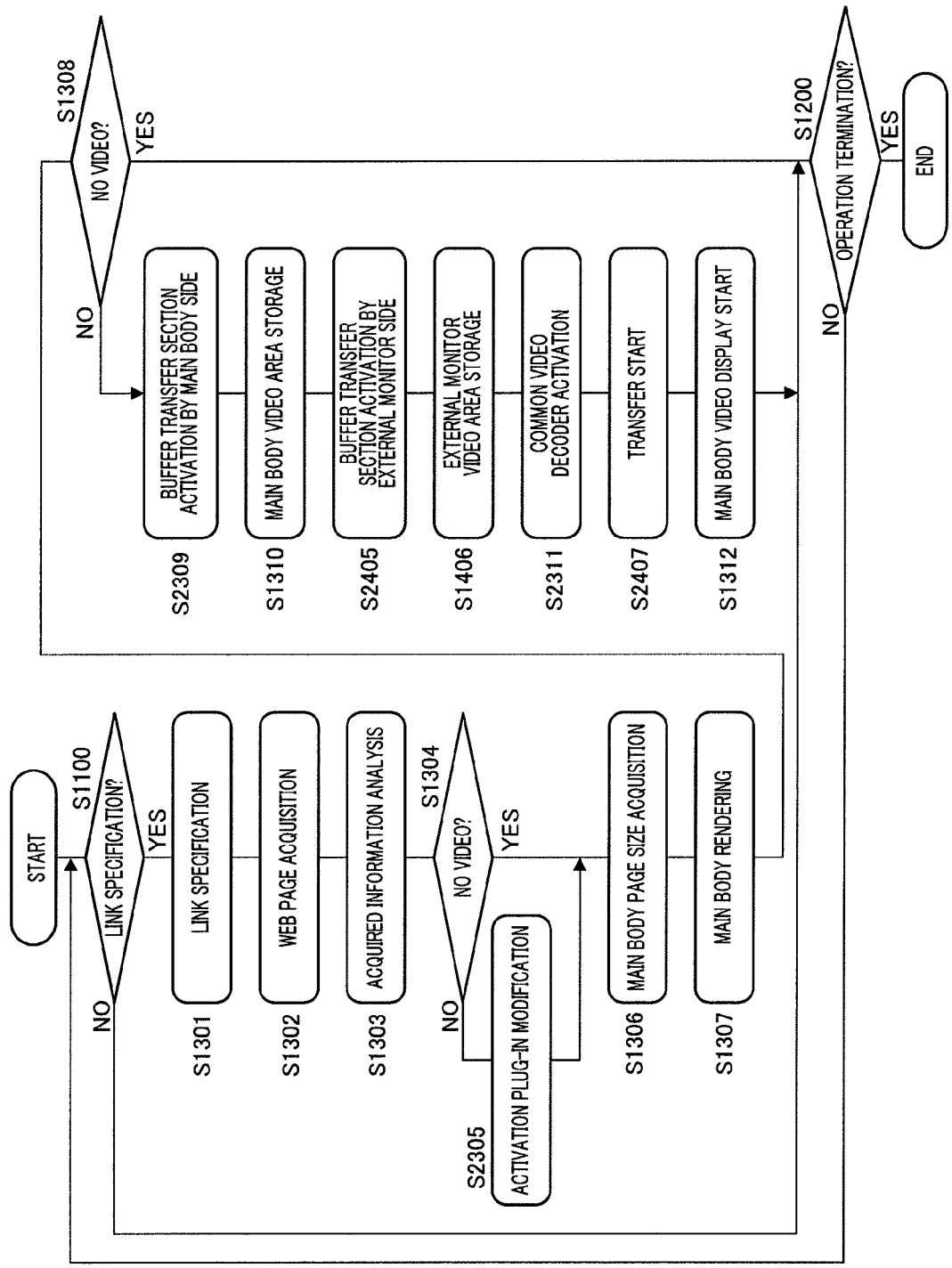
FIG. 16 is a flowchart showing the overall operation of a portable terminal according to Embodiment 2.

FIG. 16 is a flowchart showing the overall operation of portable terminal 900, corresponding to FIG. 5, FIG. 6, and FIG. 11 of Embodiment 1. Parts in FIG. 16 identical to those in FIG. 5, FIG. 6, and FIG. 11 are assigned the same reference codes as in FIG. 5, FIG. 6, and FIG. 11, and descriptions thereof are omitted here.

If browser control section 904 determines that video is included in the HTML data (S1304: NO), it performs modification of the activation plug-in for video playback on the HTML data (S2305). The object of this HTML rewrite is to specify the video data transfer source and transfer destination in addition to the transfer method specification of Embodiment 1.

If display sizes differ, the sizes of the browser windows on the displays also differ. Therefore, it is difficult to determine the relative sizes of video display areas on the buffer transfer section 908 side based only on display resolutions. That is to say, it is difficult to decide on the buffer transfer section 908 side which display is to undergo video decoding processing and which display is to receive a video data transfer.

Thus, browser control section 904 decides a video data transfer source and transfer destination, and rewrites HTML data with contents for reporting the decision results to buffer transfer section 908. Specifically, browser control section 904 holds window sizes of a plurality of displays, compares the window sizes of the displays, and decides upon the frame buffer of the display with the largest window size as the transfer source.

Here, browser control section 904 holds a browser window size when displayed by external monitor 500, and compares this window size with a browser window size when displayed by main body display section 407. In this embodiment, as stated above, a case is assumed in which the browser video display area of external monitor 500 is larger than the video display area of main body display section 407. Here, therefore, browser control section 904 decides upon video buffer 411a of external monitor frame buffer 411 as the transfer source, and decides upon video buffer 406a of main body frame buffer 406 as the transfer destination.

Browser control section 904 also decides a video data reduction ratio at the time of a transfer, and rewrites HTML data with contents for reporting the decision result to buffer transfer section 908. Specifically, browser control section 904 sets the ratio between the window size corresponding to the transfer source and the window size corresponding to the transfer destination in a WIDTH attribute and HEIGHT attribute.

This window size ratio decision is made, for example, by calculating the number of vertical-direction pixels of the main body screen relative to the number of vertical-direction pixels of the external display. Alternatively, the window size ratio decision can be made, for example, by calculating the number of horizontal-direction pixels of the main body screen relative to the number of horizontal-direction pixels of the external display. It is assumed here that browser control section 904 specifies processing that reduces the size (resolution) of the video display area to 40% both vertically and horizontally.

FIG. 17 is a drawing showing a sample extract of HTML data for main body display section 407 use after activation plug-in modification has been performed on the HTML data shown in FIG. 4. FIG. 17 corresponds to FIG. 7. Parts in FIG. 17 corresponding to those in FIG. 7 are assigned the same reference codes as in FIG. 7, and descriptions thereof are omitted here. Parts that differ from FIG. 4—that is, modified parts—are underlined.

Browser control section 904 adds PARAM tag 734 and rewrites OBJECT tag 711 to generate HTML data 730 for main body display section 407.

Specifically, as shown in FIG. 17, browser control section 904 adds PARAM tag 734 specifying the value "destination" to a Direction parameter. Browser control section 904 also rewrites the CLASSID attribute of OBJECT tag 711 in the same way as in FIG. 7, and rewrites the WIDTH attribute and HEIGHT attribute as 40%. The reason for specifying "destination" is that the main body frame buffer 406 side has been decided upon as the transfer destination. The reason for the WIDTH attribute and HEIGHT attribute being 40% is to perform reduction processing that reduces the video data size to 40% when transferring video data.

FIG. 18 is a drawing showing a sample extract of HTML data for external monitor 500 use after activation plug-in modification has been performed on the HTML data shown in FIG. 4. FIG. 18 corresponds to FIG. 7. Parts in FIG. 18 corresponding to those in FIG. 7 are assigned the same reference codes as in FIG. 7, and descriptions thereof are omitted here. Parts that differ from FIG. 4—that is, modified parts—are underlined.

Browser control section 904 rewrites OBJECT tag 711 in the same way as for HTML data 730 for main body display section 407. On the other hand, unlike in the case of HTML data 730 for main body display section 407, browser control section 904 adds PARAM tag 744 specifying the value "source" to a Direction parameter to generate HTML data 740 for external monitor 500. The reason for specifying "source" is that the external monitor 500 side has been decided upon as the transfer destination.

After performing this kind of HTML data rewriting, browser control section 904 directs main body renderer 405 to perform Web page rendering based on the HTML data for main body display section 407 (see FIG. 17) (S1306). The display data is then stored in main body frame buffer 406 (S1306 through S1308).

If video is included in the Web page (S1308: NO), main body renderer 405 specifies parameters and activates buffer transfer section 908 in the same way as in step S1309 in FIG. 6 (S2309). At this time, main body renderer 405 includes the Direction parameter specification written in the HTML data in the parameter specifications for buffer transfer section 908.

When the Direction parameter is "source", buffer transfer section 908 activates common video decoder 409. On the other hand, when the Direction parameter is "destination", buffer transfer section 908 does not activate common video decoder 409. In the HTML data for main body display section 407 (see FIG. 17), the Direction parameter is "destination". Therefore, buffer transfer section 908 does not activate common video decoder 409 in step S2309, and in step S1310 holds internally "video buffer address" specified by main body renderer 405.

Then browser control section 904 directs external monitor renderer 410 to perform Web page rendering based on the HTML data for external monitor 500 (see FIG. 18) (S2405). However, if Web page display by external monitor 500 has not been specified, browser control section 904 specifies that external monitor renderer 410 is only to perform rendering internally, and is not to display the rendered results. As a result, external monitor renderer 410 specifies parameters and activates buffer transfer section 908 in the same way as in step S1405 in FIG. 6. At this time, external monitor renderer 410 includes the Direction parameter specification written in the HTML data in the parameter specifications for buffer transfer section 908.

Buffer transfer section 908 then holds internally "video buffer address" specified by external monitor renderer 410 (S1406). As browser control section 904 has specified that rendered results are not to be displayed, external monitor frame buffer 411 data is not output to external monitor interface 412.

Then, since the Direction parameter of the HTML data for external monitor 500 (see FIG. 18) is "source", buffer transfer section 908 activates common video decoder 409 in the same way as in step S1311 in FIG. 6 (S2311). Specifically, buffer transfer section 908 determines the plug-in to be activated from "original class ID" or "original MIME type" specified by main body renderer 405. Buffer transfer section 908 also uses parameters specified by external monitor renderer 410 for other parameters. By this means, video decoding is performed as appropriate for the large video display area of external monitor 500, and the decoded video data is stored in video buffer 411a of external monitor frame buffer 411.

Then buffer transfer section 908 starts video data transfer in accordance with the Direction parameter specifications (S2407). That is to say, buffer transfer section 908 starts processing to transfer decoded video data from video buffer 411a of external monitor frame buffer 411 to video buffer 406a of main body frame buffer 406.

In this transfer processing, buffer transfer section 908 also performs video data reduction processing in accordance with the WIDTH attribute and HEIGHT attribute specifications. Specifically, once buffer transfer section 908 has acquired video data from video buffer 411a of external monitor frame buffer 411, it performs reduction processing on that video data, and outputs video data obtained as a result of the reduction processing to video buffer 406a of main body frame buffer 406. Values acquired at the time of buffer transfer section 908 activation are used as video area parameters necessary for reduction processing.

Then video decoding is started by common video decoder 409 (S1312). If Web page display by external monitor 500 has not been specified, it is specified that display data is not to be displayed on external monitor 500, as stated above, and therefore the Web page is displayed only on main body display section 407.

In this way, portable terminal 900 can decode video data as appropriate for external monitor 500 having a large video display area. Then portable terminal 900 can use video data decoded as appropriate for external monitor 500 for video display on main body display section 407 having a small video display area.

An example of the overall operation of image display system 800 will now be described. Here, a case will be described in which a Web page that includes video is displayed by main body display section 407 and external monitor 500.

Figure 19:
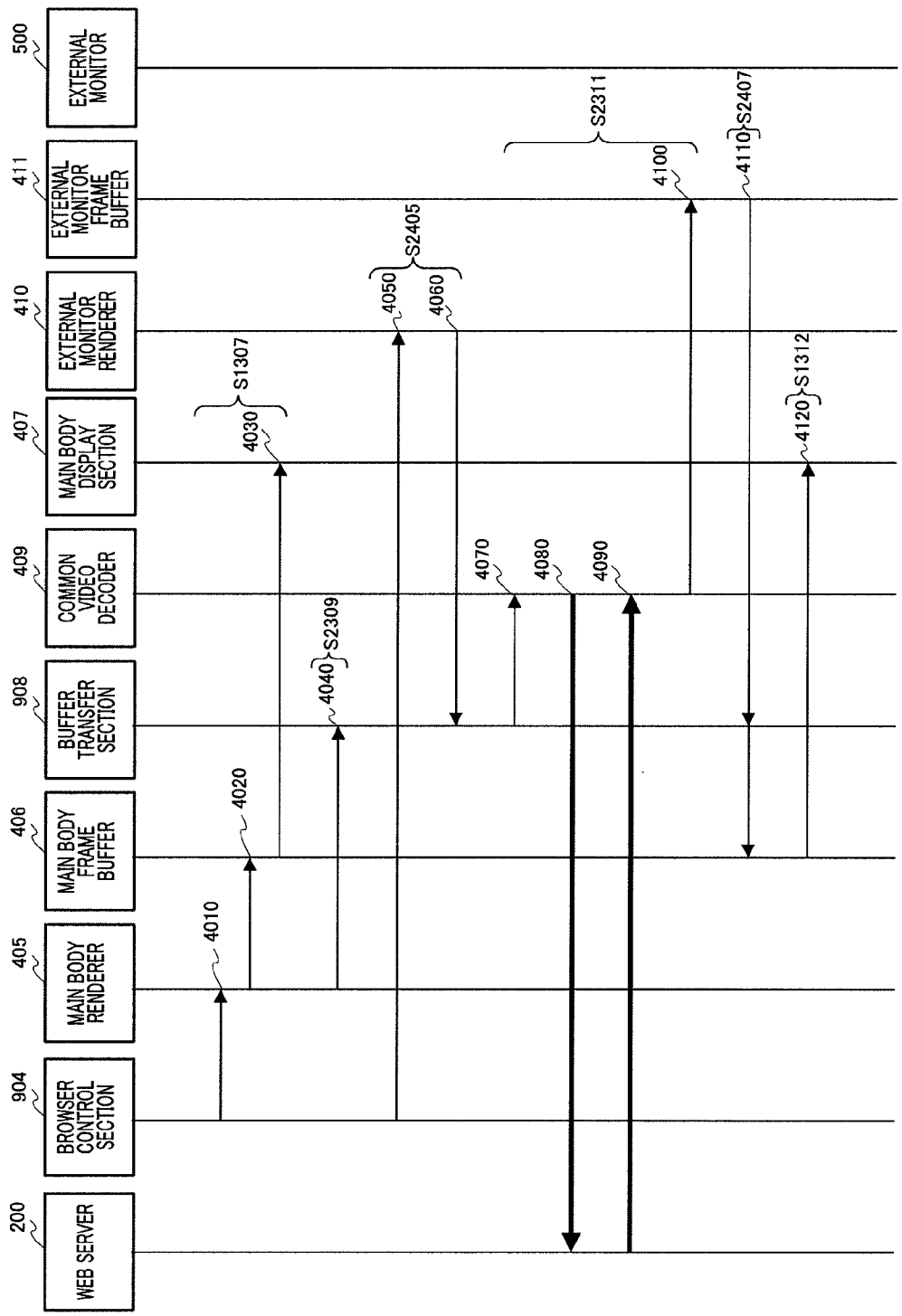
FIG. 19 is a sequence diagram showing the overall operation of an image display system according to Embodiment 2.

FIG. 19 is a sequence diagram showing the overall operation of image display system 800 up until a Web page that includes video is displayed by main body display section 407 and external monitor 500. FIG. 19 corresponds to FIG. 12 and FIG. 13 of Embodiment 1. In FIG. 19, parts up to and including signal 2070 in FIG. 12 are the same as in FIG. 12, and therefore illustrations and descriptions thereof are omitted here.

In FIG. 19, signals 4010 through 4030 correspond to step S1307 in FIG. 16. Signal 4010 is a call signal whereby browser control section 904 activates main body renderer 405. Signal 4020 is a signal whereby main body renderer 405 writes display data generated as a result of rendering to main body frame buffer 406. Signal 4030 is a signal that is output in order for display data written in main body frame buffer 406 to be displayed on main body display section 407.

Signal 4040 corresponds to step S2309 in FIG. 16. Signal 4040 is a message whereby main body renderer 405 activates buffer transfer section 908.

Signals 4050 and 4060 correspond to step S2405 in FIG. 16. Signal 4050 is a message whereby browser control section 904 activates external monitor renderer 410. Signal 4060 is a message whereby external monitor renderer 410 activates buffer transfer section 908.

Signals 4070 through 4100 correspond to step S2311 in FIG. 16. Signal 4070 is a message whereby buffer transfer section 908 activates common video decoder 409. Signal 4080 is a signal for requesting video data acquisition output by common video decoder 409 to Web server 200 based on a video file address. Signal 4090 is video data output by Web server 200 in response to signal 4080. Signal 4100 is a signal whereby common video decoder 409 writes decoded video data to video buffer 411a of external monitor frame buffer 411.

Signal 4110 corresponds to step S2407. Signal 4110 is a signal whereby buffer transfer section 908 transfers video data from video buffer 411a of external monitor frame buffer 411 to video buffer 406a of main body frame buffer 406.

Signal 4120 corresponds to step S1312. Signal 4120 is a signal for displaying display data on main body display section 407.

By means of such operations, video data decoded as appropriate for external monitor 500 is used for video display by main body display section 407.

In this way, browser control section 904 according to this embodiment compares the sizes of browser video areas displayed by a plurality of displays, and decides upon a frame buffer corresponding to the display having the largest video area as a video data transfer source. Then buffer transfer section 908 according to this embodiment transfers decoded video data stored in the transfer source frame buffer to a transfer destination frame buffer. By this means, portable terminal 900 can prevent degradation of quality on any display without performing a plurality of decoding processes when displaying video in a plurality of browsers of different sizes.

In the above embodiments, cases have been described in which two displays that display a Web page are a display of a portable terminal and a display of an external monitor, but displays to which the present invention can be applied are not limited to these. Provision may also be made for a Web page to be displayed on two displays provided on a portable terminal, or on two external monitors. Moreover, provision may also be made for a Web page to be displayed on three or more displays. In this case, it is only necessary to provide a buffer transfer section between a frame buffer that is a video data transfer source and a frame buffer that is a video data transfer destination.

A portable terminal may also be a stationary terminal connected to an external monitor and IP network using a wired network rather than a radio communication terminal connected to an external monitor and IP network by means of radio communication. If wire communication is used for connection to external monitor 500, a VGA (video graphics array) signal used by a general display, a DVI (digital visual interface) signal, or an HDMI (high-definition multimedia interface) signal can be applied to this communication. Also, if there is spare capacity in the band of a communication channel from a portable terminal to an external monitor, provision may be made for uncompressed display data to be transmitted.

Provision may also be made for a portable terminal to assign a unique identifier to each content within a Web page by means of a browser control section, and to perform plug-in activation and data transfer on an identifier-by-identifier basis by means of a buffer transfer section. Specifically, the buffer transfer section stores beforehand data necessary for buffer transfer, such as a video buffer address and display area. Then, when the buffer transfer section is activated for an external monitor, the buffer transfer section transfers video data from a main body video buffer corresponding to an identifier. By this means, display can be performed appropriately without increasing the load for performing decoding by an external monitor even if a plurality of video content is included in a Web page.

The method of determining whether or not there is video in a Web page is not limited to the method described in these embodiments. For example, provision may be made for a portable terminal to determine whether or not there is video in a Web page by determining whether or not an extension of a file shown by a link specified by a tag corresponds to a video file extension.

If a program that plays back video is activated separately from a browser, a portable terminal may acquire a position of video data in a frame buffer used by an activated process. Then the portable terminal may acquire and send video data in a display process in an external monitor. In this case, also, the video data decoding load can be reduced in the same way as in the above-described embodiments.

Data of dynamic content other than video—such as animation, or interactive content using a script—may also be transferred between frame buffers. For example, in the case of active content using an OBJECT tag or EMBED tag other than video, a portable terminal can perform determination of whether or not there is dynamic content by means of a method described in these embodiments, and transfer display data of a dynamic content area. Also, when performing transfer of a part operated by means of a script, a portable terminal can perform determination of whether or not there is dynamic content based on a SCRIPT tag, and transfer display data of a dynamic content area.

A Web page and video may be stored in separate Web servers rather than in the same Web server. Also, as well as being acquired via an IP network, HTML data can be acquired via various kinds of network employing a protocol that acquires HTML data from an HTML data storage location.

An input device other than a touch screen can be used as a portable terminal input apparatus, including a pointing device such as a mouse, touch panel, touch pad, trackpoint, or trackball, a keyboard, or a key switch.

The disclosure of Japanese Patent Application No. 2008-143706, filed on May 30, 2008, including the specification, drawings and abstract, is incorporated herein by reference in its entirety.

INDUSTRIAL APPLICABILITY

A display control apparatus, display control method, display control program, and storage medium according to the present invention are suitable for use as a display control apparatus, display control method, and display control program that enable video content to be displayed on a plurality of displays while avoiding duplication of functional sections and duplication of processing, and a storage medium in which this program is stored.

REFERENCE SIGNS LIST 100, 800 IMAGE DISPLAY SYSTEM
200 WEB SERVER
300 IP NETWORK
400, 900 PORTABLE TERMINAL
401 INPUT APPARATUS
402 IP CONNECTION INTERFACE
403 COMMON PARSER
404, 904 BROWSER CONTROL SECTION
405 MAIN BODY RENDERER
406 MAIN BODY FRAME BUFFER
407 MAIN BODY DISPLAY SECTION
408, 908 BUFFER TRANSFER SECTION
409 COMMON VIDEO DECODER
410 EXTERNAL MONITOR RENDERER
411 EXTERNAL MONITOR FRAME BUFFER
412 EXTERNAL MONITOR INTERFACE
500 EXTERNAL MONITOR
600 RADIO COMMUNICATION CHANNEL

The invention claimed is:

1. A display control apparatus, comprising:
a content acquirer that acquires dynamic content;
an information input that determines specification information of the dynamic content, the specification information specifying a dynamic content decoder for decoding the dynamic content;
an information rewriter that rewrites the specification information of the dynamic content with buffer transfer information;
a buffer transferor, that is specified by the buffer transfer information, controls decoding of the dynamic content, causes decoded dynamic content to be stored in a first buffer, and transfers the decoded dynamic content to a second buffer;
a first display controller that displays the decoded dynamic content stored in the first buffer on a first display; and
a second display controller that displays the decoded dynamic content stored in the second buffer on a second display.

2. The display control apparatus according to claim 1, wherein the content acquirer instructs the common video decoder to store the decoded dynamic content in the first buffer.

3. The display control apparatus according to claim 2, wherein the content acquirer further comprises:
a first renderer that instructs the buffer transferor specified by the buffer transfer information to execute first processing that decodes the dynamic content and stores the decoded dynamic content in the first buffer; and
a second renderer that instructs the buffer transferor specified by the buffer transfer information to execute second processing that decodes the dynamic content and stores the decoded dynamic content in the second buffer,
wherein the buffer transferor controls the dynamic content decoder to execute the first processing when execution of the first processing is instructed from the first renderer.

4. The display control apparatus according to claim 3, wherein the specification information is included in content data that describes a Web page for displaying the dynamic content.

5. The display control apparatus according to claim 4, wherein:
the information rewriter assigns identification information to each of a plurality of dynamic content when the content data describes simultaneous display of the plurality of dynamic content; and
the buffer transferor transfers the decoded dynamic content to the second buffer in association with the identification information.

6. The display control apparatus according to claim 1, wherein the buffer transferor performs reduction processing on the decoded dynamic content that is transferred to the second buffer.

7. The display control apparatus according to claim 6, wherein a first display area of the first display which displays the decoded dynamic content on which the reduction processing has not been performed is larger than a second display area of the second display which displays the decoded dynamic content on which the reduction processing has been performed.

8. The display control apparatus according to claim 7, further comprising:
a display apparatus connection that connects to a plurality of displays,
wherein the information rewriter determines a display of the plurality of displays that includes a largest display area as the first display, and determines an other display of the plurality of displays as the second display.

9. A display control method, comprising:
acquiring dynamic content;
determining specification information of the dynamic content that specifies a dynamic content decoder for decoding the dynamic content;
rewriting the specification information of the dynamic content with buffer transfer information;
controlling decoding of the dynamic content with a buffer transferor that is specified by the buffer transfer information;
storing decoded dynamic content in a first buffer for performing display on a first display; and
transferring the decoded dynamic content stored in the first buffer to a second buffer for performing display on a second display.

10. The display control method according to claim 9, further comprising:
determining whether displaying the decoded dynamic content by the second display has been specified; and
transferring the decoded dynamic content to the second buffer when the displaying the decoded dynamic content by the second display has been specified.

11. The display control method according to claim 9, further comprising reducing the decoded dynamic content that is transferred to the second buffer.

12. A display control method, comprising:
acquiring dynamic content;
determining specification information of the dynamic content that specifies a dynamic content decoder for decoding the dynamic content;
rewriting the specification information of the dynamic content with buffer transfer information;
instructing, by a first renderer, a buffer transferor that is specified by the specification information to execute first processing that decodes the dynamic content and stores decoded dynamic content in a first buffer for performing display on a first display; and
instructing, by a second renderer, the buffer transferor that is specified by the specification information to execute second processing that decodes the dynamic content and stores the decoded dynamic content in a second buffer for performing display on a second display,
wherein, when the first renderer instructs execution of the first processing to the buffer transferor, the dynamic content decoder decodes the dynamic content and stores the decoded dynamic content in the first buffer; and
when the second renderer gives instructs execution of the second processing to the buffer transferor, the buffer transferor transfers the decoded dynamic content stored in the first buffer to the second buffer, and stores the decoded dynamic content in the second buffer.

* * * * *